US011119394B2

(12) United States Patent
Akiyama

(10) Patent No.: US 11,119,394 B2
(45) Date of Patent: Sep. 14, 2021

(54) LIGHT SOURCE DEVICE, ILLUMINATION OPTICAL DEVICE, AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/003,315

(22) Filed: Aug. 26, 2020

(65) Prior Publication Data
US 2021/0063853 A1  Mar. 4, 2021

(30) Foreign Application Priority Data

Aug. 27, 2019 (JP) .............................. JP2019-154611

(51) Int. Cl.
| G03B 21/20 | (2006.01) |
| G02B 27/28 | (2006.01) |
| H04N 9/31 | (2006.01) |
| G02F 1/13357 | (2006.01) |
| G02F 1/1335 | (2006.01) |
| G03B 33/12 | (2006.01) |

(52) U.S. Cl.
CPC ......... *G03B 21/204* (2013.01); *G02B 27/283* (2013.01); *G02F 1/133526* (2013.01); *G02F 1/133621* (2013.01); *G03B 21/2013* (2013.01); *G03B 21/2066* (2013.01); *G03B 21/2073* (2013.01); *G03B 33/12* (2013.01); *H04N 9/3161* (2013.01); *H04N 9/3164* (2013.01); *H04N 9/3167* (2013.01)

(58) Field of Classification Search
CPC .... G03B 21/006; G03B 21/008; G03B 21/28; G03B 21/204; G03B 21/208; G03B 21/2013; G03B 21/2033; G03B 21/2053; G03B 21/2066; G03B 21/2073; H04N 9/317; H04N 9/3105; H04N 9/3155; H04N 9/3158; H04N 9/3161; H04N 9/3164; H04N 9/3167; H04N 9/3173; H04N 9/3197; G02F 1/13; G02F 1/133526; G02F 1/133557; G02F 1/133603; G02F 1/133605; G02F 1/133614; G02F 1/133621; G02B 27/16; G02B 27/18; G02B 27/28; G02B 27/30; G02B 27/286

See application file for complete search history.

(56) References Cited

U.S. PATENT DOCUMENTS

| 5,161,042 A | 11/1992 | Hamada | |
| 2016/0119595 A1* | 4/2016 | Lyubarsky | ............ G02B 27/145 353/20 |
| 2018/0131917 A1* | 5/2018 | Sato | ............ G02B 27/1026 |

FOREIGN PATENT DOCUMENTS

JP      H04-060538 A      2/1992

* cited by examiner

*Primary Examiner* — Sultan Chowdhury
(74) *Attorney, Agent, or Firm* — Oliff PLC

(57) ABSTRACT

A light source device configured to emit a light beam in a first direction includes a first exit position from which a first colored light beam is emitted, a second exit position from which a second colored light beam is emitted, a third exit position from which a third colored light beam is emitted, and a fourth exit position from which a fourth colored light beam is emitted, at least one of the first through fourth colored light beams is a target colored light beam which has a peak wavelength out of a reference wavelength range, and a beam diameter of which is to be adjusted, an adjusting element disposed on a light path of the target colored light beam.

15 Claims, 18 Drawing Sheets

LIGHT SOURCE DEVICE, ILLUMINATION OPTICAL DEVICE, AND PROJECTOR

The present application is based on, and claims priority from JP Application Serial Number 2019-154611, filed Aug. 27, 2019, the disclosure of which is hereby incorporated by reference herein in its entirety.

BACKGROUND

1. Technical Field

The present disclosure relates to a light source device, an illumination optical device, and a projector.

2. Related Art

In the past, there has been known a projector which modulates light emitted from a light source to form an image corresponding to image information, and then projects the image thus formed. As such a projector, there has been known a single-panel projector which spatially separates the light emitted from a white light source into a plurality of colored light beams, and then makes the colored light beams thus separated respectively enter the corresponding sub-pixels to thereby perform color display (see, e.g., JP-A-4-60538 (Document 1)).

In the projector described in Document 1, a red-light reflecting dichroic mirror, a green-light reflecting dichroic mirror, and a blue-light reflecting dichroic mirror are arranged along the incident light axis of the light emitted from the light source in a state of being nonparallel to each other. Thus, the light emitted from the light source is separated into a red light beam, a green light beam, and a blue light beam having respective proceeding directions slightly different from each other on the same plane. The red light beam, the green light beam, and the blue light beam thus separated into are each collected by a microlens disposed on the incident side of a light modulation element, and then respectively enter red sub-pixels, green sub-pixels, and blue sub-pixels of the light modulation element in the spatially separated state.

However, in the projector described in Document 1, each of the colored light beams separated into by the respective dichroic mirrors are not spatially separated at a stage before entering the microlenses. Therefore, each of the colored light beams is apt to enter not only the corresponding sub-pixels but also other sub-pixels, and there is a problem that the color reproducibility of the image formed by the light modulation devices is low. In contrast, it is conceivable to adopt a light source device for emitting a plurality of colored light beams spatially separated from each other, and a superimposing lens for superimposing the plurality of colored light beams emitted from the light source device on each other in a projector.

Further, the light entering a liquid crystal display element as the light modulation device needs to be single-species linearly polarized light. However, in the projector described in Document 1, since there is adopted a light source lamp for emitting unpolarized light as the white light source, there is a problem that the contrast of the image projected is low. In contrast, when a polarization plate for blocking linearly polarized light not suitable for image formation in the liquid crystal display element is disposed between the white light source and the liquid crystal display element, there is a problem that the use efficiency of the light emitted from the white light source decreases.

To cope with the decrease in use efficiency of the light, it is conceivable that an incident side multi-lens for dividing the incident light into a plurality of partial light beams, an exit side multi-lens, and a polarization conversion element for uniforming the polarization direction of the plurality of partial light beams entering the polarization conversion element via the exit side multi-lens are disposed between the white light source and the liquid crystal display element in the projector having the superimposing lens described above.

However, when the colored light beams which are spatially separated from each other and enter the incident side multi-lens are different in beam diameter from each other, the superimposing performance of the colored light beams by the superimposing lens deteriorates, and there is a possibility that a illuminance variation occurs in the liquid crystal display element as an illumination target, and by extension, there is a possibility that a color variation occurs in an image to be formed by the liquid crystal display element.

It should be noted that when disposing a light blocking plate for blocking a part of the incident light to thereby uniform the beam diameter of the plurality of colored light beams, there is a problem that the use efficiency of the light which is emitted from the light source device and is used for the image formation by the liquid crystal display element decreases.

SUMMARY

A light source device according to a first aspect of the present disclosure is a light source device configured to emit a light beam in a first direction including a first exit position from which a first colored light beam is emitted, a second exit position which is located at a second direction side of the first exit position, and from which a second colored light beam is emitted, a third exit position which is located at a third direction side of the first exit position, and from which a third colored light beam is emitted, and a fourth exit position which is located at the second direction side of the third exit position, and from which a fourth colored light beam is emitted, wherein the second direction and the third direction are perpendicular to the first direction, and are perpendicular to each other, at least one of the first colored light beam, the second colored light beam, the third colored light beam, and the fourth colored light beam is a target colored light beam which has a peak wavelength out of a reference wavelength range, and a beam diameter of which is to be adjusted, an adjusting element is disposed in a light path of the target colored light beam, and the adjusting element is one of a diameter reduction element configured to reduce the beam diameter of the target colored light beam when the target colored light beam has the peak wavelength longer than an upper limit value of the reference wavelength range, and a diameter expansion element configured to expand the beam diameter of the target colored light beam when the target colored light beam has the peak wavelength shorter than a lower limit value of the reference wavelength range.

In the first aspect described above, the diameter reduction element may be one of a convex lens and a concave mirror, and the diameter expansion element may be one of a concave lens and a convex mirror.

In the first aspect described above, out of the first colored light beam, the second colored light beam, the third colored light beam, and the fourth colored light beam, one may be a green light beam, one may be a red light beam, one may be a blue light beam, and one may be one of a green light beam and a yellow light beam.

In the first aspect described above, one of the first colored light beam and the second colored light beam may be the blue light beam, another of the first colored light beam and the second colored light beam may be one of the green light beam and the yellow light beam, one of the third colored light beam and the fourth colored light beam may be the green light beam, and another of the third colored light beam and the fourth colored light beam may be the red light beam.

In the first aspect described above, the reference wavelength range may be included in a wavelength region of the green light beam, the diameter reduction element may be disposed in a light path of the red light beam as the other of the third colored light beam and the fourth colored light beam, and the diameter expansion element may be disposed in a light path of the blue light beam as the one of the first colored light beam and the second colored light beam.

In the first aspect described above, the other of the first colored light beam and the second colored light beam may be the yellow light beam, and the diameter reduction element may be disposed in a light path of the yellow light beam as the other of the first colored light beam and the second colored light beam.

In the first aspect described above, the other of the first colored light beam and the second colored light beam may be the green light beam, and a blocking element configured to transmit the green light and block another colored light beam may be disposed in a light path of the green light beam as the other of the first colored light beam and the second colored light beam.

The first aspect described above may further include a first color separation element configured to separate the first colored light beam and the second colored light beam from a light beam including the first colored light beam and the second colored light beam, and a second color separation element configured to separate the third colored light beam and the fourth colored light beam from a light beam including the third colored light beam and the fourth colored light beam.

In the first aspect described above, the adjusting element may be disposed in the light path of the target colored light beam separated by a color separation element configured to separate the target colored light beam out of the first color separation element and the second color separation element.

In the first aspect described above, the adjusting element may be integrated with the color separation element configured to separate the target colored light beam out of the first color separation element and the second color separation element.

In the first aspect described above, the first color separation element may include a first color separation layer configured to transmit the first colored light beam, and reflect the second colored light beam, and a first reflecting layer located at the second direction side of the first color separation layer, and configured to reflect the second colored light beam reflected by the first color separation layer in parallel to the first colored light beam transmitted through the first color separation layer, and the second color separation element may include a second color separation layer configured to transmit the third colored light beam, and reflect the fourth colored light beam, and a second reflecting layer located at the second direction side of the second color separation layer, and configured to reflect the fourth colored light beam reflected by the second color separation layer in parallel to the third colored light beam transmitted through the second color separation layer.

In the first aspect described above, when the adjusting element is disposed in a light path of the first colored light beam, the first color separation layer may be provided to a plane of incidence of light of the adjusting element, when the adjusting element is disposed in a light path of the second colored light beam, the first reflecting layer may be provided to the plane of incidence of light of the adjusting element, when the adjusting element is disposed in a light path of the third colored light beam, the second color separation layer may be provided to the plane of incidence of light of the adjusting element, and when the adjusting element is disposed in a light path of the fourth colored light beam, the second reflecting layer may be provided to the plane of incidence of light of the adjusting element.

The first aspect described above may further include a light source section configured to emit a source light beam, a first polarization split element configured to transmit a first polarization component of the source light beam in the third direction, and reflect a second polarization component of the source light beam in an opposite direction to the first direction out of the source light beam emitted from the light source section and enters the first polarization split element along the third direction, a second polarization split element located at the third direction side of the first polarization split element, and configured to reflect the first polarization component of the source light beam entering the second polarization split element in the third direction toward the opposite direction to the first direction, a first reflecting element located in the opposite direction side to the first direction side of the first polarization split element, and configured to reflect the source light beam entering the first reflecting element toward the first direction, a first retardation element located between the first polarization split element and the first reflecting element in the first direction, and configured to convert a polarization component of the source light beam, a wavelength conversion element located at the opposite direction side to the first direction side of the second polarization split element, and configured to emit a converted light beam as unpolarized light, which is obtained by performing wavelength conversion on the first polarization component of the source light beam entering the wavelength conversion element in the opposite direction to the first direction, toward the first direction, a second retardation element which is a ½ wave plate located in the light path of the first colored light beam separated by the first color separation element, and converts a polarization direction of the first colored light beam and then emits the first colored light beam, and a third retardation element which is a ½ wave plate which is located at the first direction side of the second polarization split element, and which the converted light beam transmitted through the second polarization split element enters, wherein the second polarization split element may transmit the first polarization component of the converted light beam in the first direction to thereby make the first polarization component enter the third retardation element, and may reflect the second polarization component of the converted light beam toward an opposite direction to the third direction out of the converted light beam entering the second polarization split element in the first direction, the first polarization split element may transmit the first polarization component of the source light beam entering the first polarization split element in the first direction toward the first direction to thereby make the first polarization component enter the first color separation element, and may reflect the second polarization component of the converted light beam entering the first polarization split element in the opposite direction to the third direction toward the first direction to thereby make the second polarization component enter the first color separation element, the first color separation element may be located at the first direction side of the first polarization split element, may emit the first polarization component of the source light beam entering the first color separation element from the first polarization split element to the second retardation element, and may emit the second polarization component of the converted light beam entering the first color separation element from the first polarization split element, and the second color separation element may be located at the first direction side of the third retardation element, may emit a first color component included in the second polarization component of the converted light beam entering the second color separation element from the third retardation element, and may emit a second color component included in the second polarization component of the converted light beam.

An illumination optical device according to a second aspect of the present disclosure includes the light source device described above, a pair of multi-lenses configured to divide the light beam entering the pair of multi-lenses from the light source device into a plurality of partial light beams, and a superimposing lens configured to superimpose the plurality of partial light beams entering the superimposing lens from the pair of multi-lenses on a predetermined position.

A projector according to a third aspect of the present disclosure includes the illumination optical device described above, a light modulation device configured to modulate light emitted from the illumination optical device, and a projection optical device configured to project the light modulated by the light modulation device, wherein the light modulation device includes a single liquid crystal panel having a plurality of pixels, and a microlens array which has a plurality of microlenses corresponding to the plurality of pixels, and is located at a light incident side of the single liquid crystal panel, the pixels each include a first sub-pixel, a second sub-pixel, a third sub-pixel, and a fourth sub-pixel, and the plurality of microlenses makes the first colored light beam enter the first sub-pixels, the second colored light beam enter the second sub-pixels, the third colored light beam enter the third sub-pixels, and the fourth colored light beam enter the fourth sub-pixels.

DESCRIPTION OF EXEMPLARY EMBODIMENTS

First Embodiment

A first embodiment of the present disclosure will hereinafter be described based on the drawings.

Schematic Configuration of Projector

Figure 1:
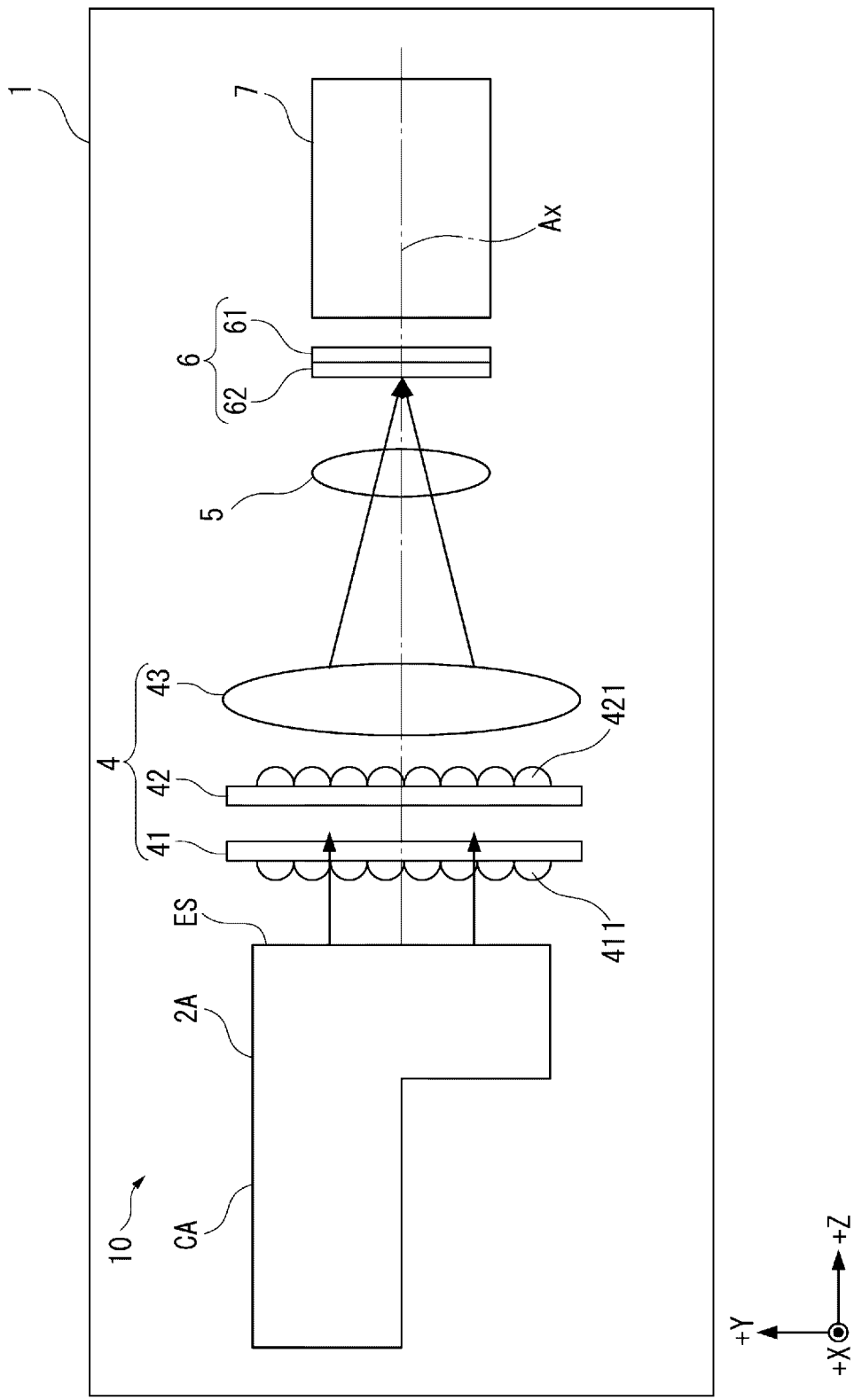
FIG. 1 is a schematic diagram showing an internal configuration of a projector according to a first embodiment.

FIG. 1 is a schematic diagram showing an internal configuration of a projector 1 according to the present embodiment.

The projector 1 according to the present embodiment is for modulating the light emitted from a light source device 2A to form an image corresponding to image information, and then projecting the image thus formed on a projection target surface such as a screen in an enlarged manner. Specifically, the projector 1 is a so-called single-panel projector, and modulates the light emitted from a light source device 2A with a single light modulation device 6 having a single liquid crystal panel 61 to thereby form an image, and then projects the image thus formed.

As shown in FIG. 1, the projector 1 is provided with the light source device 2A, a homogenization device 4, a field lens 5, the light modulation device 6, and a projection optical device 7, wherein these constituents are disposed at predetermined positions on an illumination light axis Ax preset in the projector 1.

It should be noted that the light source device 2A and the homogenization device 4 constitute an illumination optical device 10 for illuminating an image formation area in the light modulation device 6.

Schematic Configuration of Light Source Device

The light source device 2A emits a plurality of colored light beams which are the same linearly polarized light, and are spatially separated from each other. Specifically, the light source device 2A emits a first colored light beam, a second colored light beam, a third colored light beam, and a fourth colored light beam, which are linearly polarized light beams polarized in the same polarization direction, from respective exit positions different from each other. In the present embodiment, the light source device 2A emits a blue light beam as the first colored light beam, a yellow light beam as the second colored light beam, a green light beam as the third colored light beam, and a red light beam as the fourth colored light beam.

The light source device 2A has a chassis CA as a light source device chassis for housing optical components constituting the light source device 2A inside. The colored light beams to be emitted from the light source device 2A are emitted from an exit surface ES opposed to the homogenization device 4 in the chassis CA.

It should be noted that the configuration of the light source device 2A will be described later in detail.

In the following description, a direction in which the light source device 2A emits the light along the illumination light axis Ax is defined as a +Z direction, and two directions perpendicular to the +Z direction and perpendicular to each other are defined as a +X direction and a +Y direction. In these directions, the +Y direction is defined as an upper direction in the projector 1. Further, the +X direction is defined as a right-hand direction when viewing an object which the light enters along the +Z direction so that the +Y direction points the upper side. Although not shown in the drawings, an opposite direction to the +X direction is defined as a −X direction, an opposite direction to the +Y direction is defined as a −Y direction, and an opposite direction to the +Z direction is defined as a −Z direction.

It should be noted that the +Z direction corresponds to a first direction, the −Y direction corresponds to a second direction, and the +X direction corresponds to a third direction.

Configuration of Homogenization Device

The homogenization device 4 homogenizes the illuminance in the light modulation device 6 illuminated by the light emitted from the light source device 2A. The homogenization device 4 has two multi-lenses 41, 42 and a superimposing lens 43.

The multi-lens 41 has a plurality of lenses 411 arranged in a matrix in a plane perpendicular to a central axis of a light flux entering the multi-lens 41 from the light source device 2A. In other words, the multi-lens 41 has a plurality of lenses 411 arranged in a matrix in a plane perpendicular to the illumination light axis Ax parallel to the +Z direction. The multi-lens 41 divides each of the colored light beams entering the multi-lens 41 from the light source device 2A into a plurality of partial light beams with the lenses 411.

Figure 2:
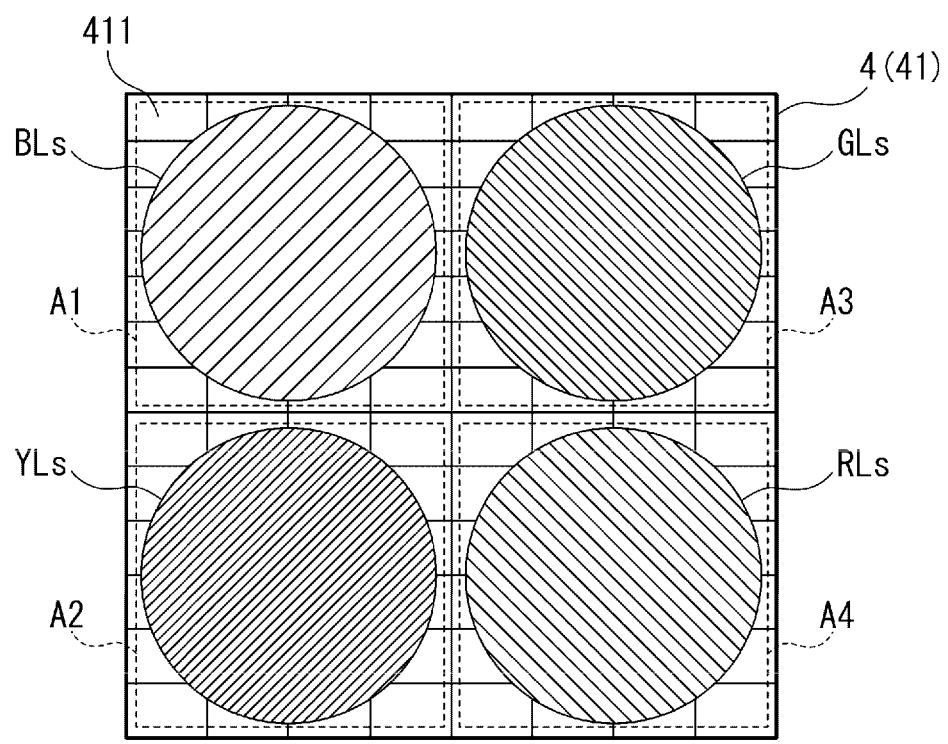
FIG. 2 is a schematic diagram showing incident positions of colored light beams in a multi-lens in the first embodiment.

FIG. 2 is a schematic diagram of the multi-lens 41 viewed from the −Z direction as a light incident side. In other words, FIG. 2 is a schematic diagram showing incident positions of the respective colored light beams emitted from the light source device 2A in the multi-lens 41.

Specifically, the blue light beam BLs, the yellow light beam YLs, the green light beam GLs, and the red light beam RLs emitted from the light source device 2A enter the multi-lens 41 as shown in FIG. 2.

The blue light beam BLs as the first colored light beam enters an area A1 located at the −X direction side and the +Y direction side in the multi-lens 41.

The yellow light beam YLs as the second colored light beam enters an area A2 located at the −X direction side and the −Y direction side in the multi-lens 41.

The green light beam GLs as the third colored light beam enters an area A3 located at the +X direction side and the +Y direction side in the multi-lens 41.

The red light beam RLs as the fourth colored light beam enters an area A4 located at the +X direction side and the −Y direction side in the multi-lens 41.

Then, the colored light beams having entered the areas A1 through A4 are each divided into a plurality of partial light beams by the plurality of lenses 411 disposed in each of the areas, and then enter corresponding lenses 421 in the multi-lens 42.

As shown in FIG. 1, the multi-lens 42 has the plurality of lenses 421 corresponding respectively to the plurality of lenses 411, and the partial light beam emitted from corresponding one of the lenses 411 enters each of the lenses 421. Each of the lenses 421 makes the partial light beam, which has entered the lens 421, enter the superimposing lens 43.

The superimposing lens 43 superimposes the plurality of partial light beams entering the superimposing lens 43 from the multi-lens 42 on the light modulation device 6. Specifically, the multi-lens 42 and the superimposing lens 43 make the blue light beam BLs, the yellow light beam YLs, the green light beam GLs, and the red light beam RLs each divided into the plurality of partial light beams enter a plurality of microlenses 621 constituting a microlens array 62 described later of the light modulation device 6 at respective angles different from each other via the field lens 5.

Configuration of Field Lens

The field lens 5 is disposed between the homogenization device 4 and the light modulation device 6 in the +Z direction. The field lens 5 makes the whole of the light flux, which enters the light modulation device 6 from the light source device 2A via the homogenization device 4, telecentric.

Configuration of Light Modulation Device

The light modulation device 6 is provided alone to the projector 1. The light modulation device 6 modulates the light emitted from the light source device 2A to form the image corresponding to the image information. Specifically, the light modulation device 6 modulates each of the colored light beams which are emitted from the illumination optical device 10 having the light source device 2A and the homogenization device 4, and then enter the light modulation device 6 via the field lens 5 to form the image corresponding to the image information.

The light modulation device 6 is provided with the liquid crystal panel 61 and the microlens array 62.

Configuration of Liquid Crystal Panel

Figure 3:
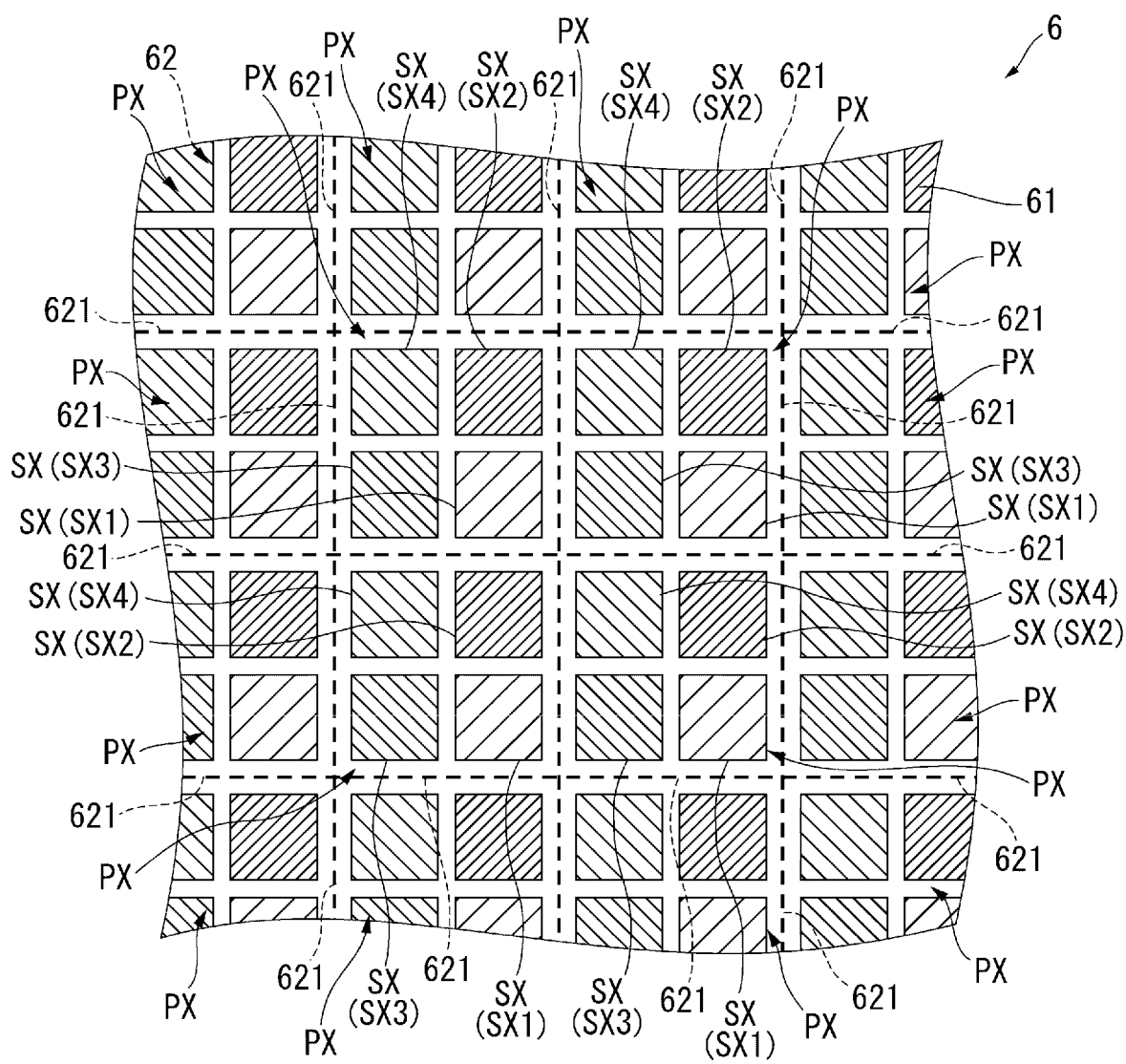
FIG. 3 is a schematic diagram showing in an enlarged manner a part of a light modulation device in the first embodiment.

FIG. 3 is a schematic diagram showing in an enlarged manner a part of the light modulation device 6 viewed from the −Z direction as the light incident side. In other words, FIG. 3 is a schematic diagram showing a correspondence relationship between the pixels PX provided to the liquid crystal panel 61 and the microlenses 621 provided to the microlens array 62.

As shown in FIG. 3, the liquid crystal panel 61 has the plurality of pixels PX arranged in a matrix in an orthogonal plane with respect to the illumination light axis Ax.

Each of the pixels PX has a plurality of sub-pixels SX for respectively modulating corresponding colored light beams. In the present embodiment, each of the pixels PX has four sub-pixels SX1, SX2, SX3, and SX4.

Specifically, in one pixel PX, the first sub-pixel SX1 is disposed at a position on the −X direction side and −Y direction side, and the second sub-pixel SX2 is disposed at a position on the −X direction side and +Y direction side. Further, in one pixel PX, the third sub-pixel SX3 is disposed at a position on the +X direction side and −Y direction side, and the fourth sub-pixel SX4 is disposed at a position on the +X direction side and +Y direction side.

Configuration of Microlens Array

The microlens array 62 is disposed on the −Z direction side as the light incident side with respect to the liquid crystal panel 61, and guides the colored light beam entering the microlens array 62 to the corresponding sub-pixel SX. The microlens array 62 has the plurality of microlenses 621 corresponding to the plurality of pixels PX.

The plurality of microlenses 621 is arranged in a matrix in an orthogonal plane with respect to the illumination light axis Ax. In other words, the plurality of microlenses 621 is arranged in a matrix in an orthogonal plane with respect to the central axis of the light entering the plurality of microlenses 621 from the field lens 5.

The blue light beam BLs, the yellow light beam YLs, the green light beam GLs, and the red light beam RLs which are each the plurality of partial light beams are superimposed by the homogenization device 4, and the colored light beams enter each of the microlenses 621 at respective angles different from each other. Each of the microlenses 621 makes each of the colored light beams entering the microlens 621 enter the corresponding sub-pixel SX.

In the present embodiment, one microlens 621 is disposed so as to correspond to one pixel PX. In other words, the one microlens 621 is disposed so as to correspond to the four sub-pixels SX1 through SX4 constituting the one pixel PX. The microlenses 621 each guide the blue light beam BLs as the first colored light beam to the first sub-pixel SX1 out of the sub-pixels SX of the corresponding pixel PX, and each guide the yellow light beam YLs as the second colored light beam to the second sub-pixel SX2. Further, the microlenses 621 each guide the green light beam GLs as the third colored light beam to the third sub-pixel SX3, and each guide the red light beam RLs as the fourth colored light beam to the fourth sub-pixel SX4.

Thus, the colored light beams respectively enter the corresponding sub-pixels SX1 through SX4, and the colored light beams are respectively modulated by the corresponding sub-pixels SX1 through SX4. Such a modulation of the incident colored light beams by the sub-pixels SX1 through SX4 is performed in each of the pixels PX of the liquid crystal panel 61.

Configuration of Projection Optical Device

The projection optical device 7 projects the light modulated by the light modulation device 6. Specifically, the projection optical device 7 projects the image, which is formed by the liquid crystal panel 61 modulating the colored light beams having entered the liquid crystal panel 61, on the projection target surface not shown. As such a projection optical device 7, there can be adopted a combination lens having a mirror tube and at least one lens disposed in the mirror tube.

Detailed Configuration of Light Source Device

Figure 4:
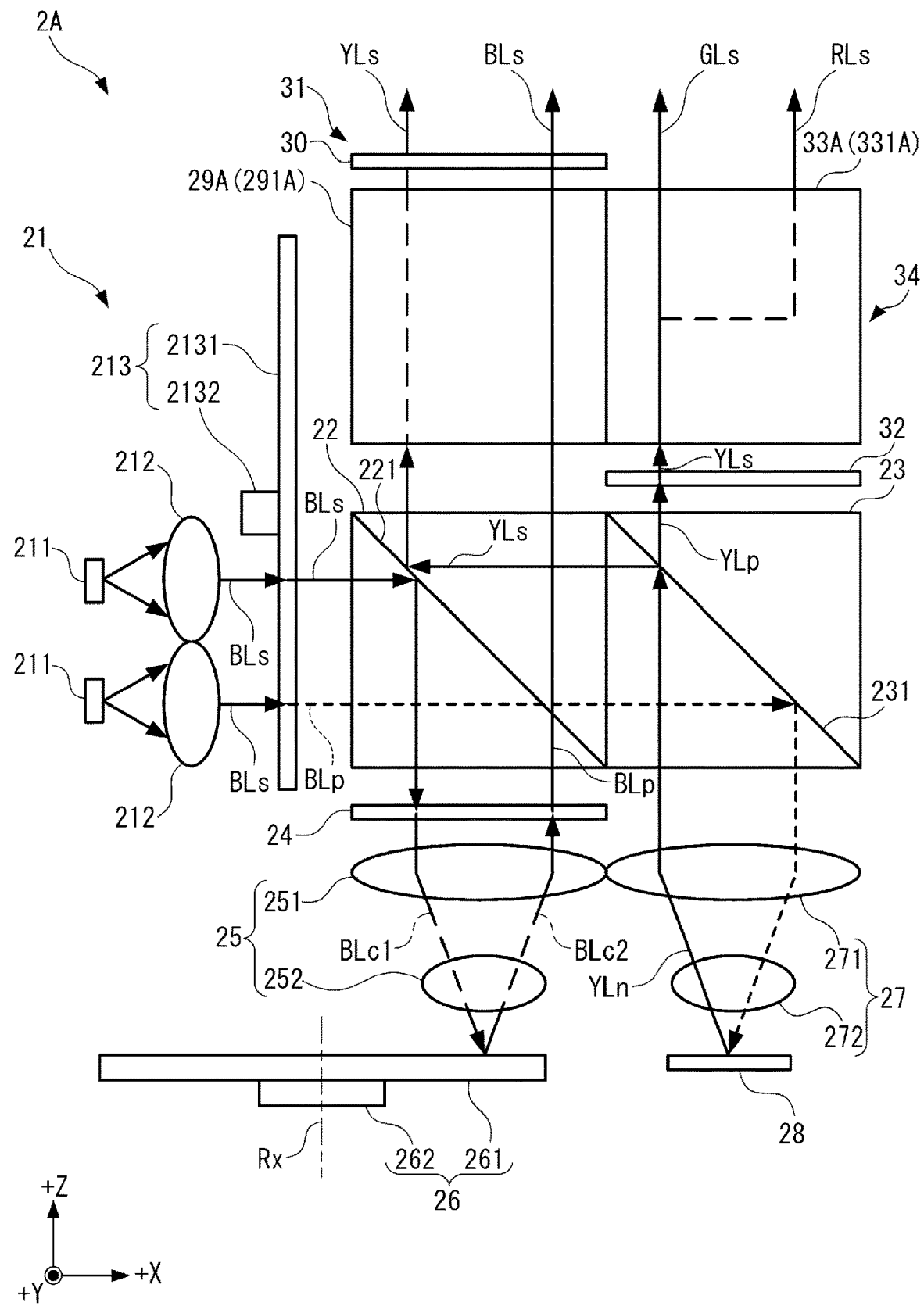
FIG. 4 is a schematic diagram showing a configuration of a light source device according to the first embodiment.

FIG. 4 is a schematic diagram showing a configuration of the light source device 2A. In other words, FIG. 4 is a plan view of the light source device 2A viewed from the +Y direction.

The light source device 2A emits the light for illuminating the light modulation device 6 in the +Z direction. As described above, the light emitted by the light source device 2A is the linearly polarized light with the uniform polarization direction, and corresponds to the blue light beam as the first colored light beam, the yellow light beam as the second colored light beam, the green light beam as the third colored light beam, and the red light beam as the fourth colored light beam spatially separated from each other. Specifically, the light source device 2A emits the blue light beam BLs, the yellow light beam YLs, the green light beam GLs, and the red light beam RLs.

As shown in FIG. 4, the light source device 2A has a light source section 21, a first polarization split element 22, a second polarization split element 23, a first retardation element 24, a first light collection element 25, a first reflecting element 26, a second light collection element 27, a wavelength conversion element 28, a first color separation element 29A, a second retardation element 30, a second reflecting element 31, a third retardation element 32, a second color separation element 33A, and an adjusting element 34.

Configuration of Light Source Section

The light source section 21 emits source light beam which enters the first polarization split element 22 along the +X direction. The light source section 21 has light sources 211, collimator lenses 212, and a rotary retardation device 213.

The light source 211 is a solid-state light source for emitting the blue light beam. Specifically, the light sources 211 are each a semiconductor laser for emitting the blue light beam BLs as the s-polarized light to a polarization split layer 221 of the first polarization split element 22 and a polarization split layer 231 of the second polarization split element 23. The blue light beam BLs emitted by the light source 211 is a laser beam having a peak wavelength of, for example, 450 through 460 nm.

The collimator lenses 212 collimates the light beams emitted from the light sources 211, respectively.

The rotary retardation device 213 has a retardation element 2131 as a fourth retardation element, and a rotating device 2132 for rotating the retardation element 2131 centering on a rotational axis parallel to the +X direction.

The retardation element 2131 is one of a ½ wave plate and a ¼ wave plate. A part of the blue light beam BLs as the s-polarized light having entered the retardation element 2131 is converted into a blue light beam BLp as p-polarized light while passing through the retardation element 2131. Therefore, the blue light beam having been transmitted through the retardation element 2131 turns to light in which the blue light beam BLs as the original s-polarized light and the blue light beam BLp as the p-polarized light mixed with each other at a predetermined rate. Further, by the rotating device 2132 adjusting the rotational angle of the retardation element 2131, the ratio between the blue light beam BLs and the blue light beam BLp included in the blue light beam having been transmitted through the retardation element 2131 is adjusted. It should be noted that the rotating device 2132 for rotating the retardation element 2131 can be eliminated.

As described above, the light source section 21 emits the source light beam including the blue light beam BLp, which is a first polarization component, and is the p-polarized light with respect to the polarization split layer 221 of the first polarization split element 22 and the polarization split layer 231 of the second polarization split element 23, and the blue light beam BLs, which is a second polarization component, and is the s-polarized light with respect to the polarization split layer 221 of the first polarization split element 22 and the polarization split layer 231 of the second polarization split element 23.

It should be noted that, the light source 211 has the configuration of emitting the blue light beam BLs as the s-polarized light as described above, but can be arranged to have a configuration of emitting the blue light beam BLs as the s-polarized light and the blue light beam BLp as the p-polarized light. In this case, the rotary retardation device 213 can be eliminated. Further, it is also possible for the light source 211 to be provided with another solid-state light source such as LED (Light Emitting Diode) instead of the semiconductor laser.

In the following description, when the s-polarized light is mentioned, it means the s-polarized light with respect to the polarization split layer 221 of the first polarization split element 22 and the polarization split layer 231 of the second polarization split element 23. Similarly, when the p-polarized light is mentioned, it means the p-polarized light with respect to the polarization split layer 221 of the first polarization split element 22 and the polarization split layer 231 of the second polarization split element 23.

In the present embodiment, the p-polarized light corresponds to the first polarization component, and the s-polarized light corresponds to the second polarization component.

Configuration of First Polarization Split Element

The blue light beams BLs, BLp as the source light beam enter the first polarization split element 22 along the +X direction.

The first polarization split element 22 is a prism-type polarization split element formed by combining two prism segments each shaped like a substantially isosceles right triangular prism to have a substantially rectangular shape, and on the interface between the two prism segments, there is disposed the polarization split layer 221.

The polarization split layer 221 is tilted 45° with respect to the +X direction and the +Z direction. Specifically, the polarization split layer 221 is tilted 45° with respect to the X-Y plane and the Y-Z plane.

The polarization split layer 221 has a polarization split characteristic of transmitting the p-polarized light and reflecting the s-polarized light out of the incident light. Alternatively, the polarization split layer 221 has a wavelength-selective polarization split characteristic of transmitting the p-polarized light and reflecting the s-polarized light when the incident light is the blue light beam while reflecting the incident light irrespective of the polarization state when the incident light is light longer in wavelength than the blue light beam.

Therefore, the first polarization split element 22 transmits the blue light beam BLp which is the p-polarized light as the first polarization component along the +X direction, and reflects the blue light beam BLs which is the s-polarized light as the second polarization component toward the −Z direction out of the source light beam entering the first polarization split element 22 along the +X direction.

It should be noted that the first polarization split element 22 is not limited to the prism-type polarization split element, but can be a plate-type polarization split element having the polarization split layer 221.

Configuration of Second Polarization Split Element

The second polarization split element 23 is located at the +X direction side of the first polarization split element 22. The blue light beam BLp having passed through the first polarization split element 22 enters the second polarization split element 23.

Similarly to the first polarization split element 22, the second polarization split element 23 is the prism-type polarization split element, and has the polarization split layer 231 disposed on an interface between two prism segments.

The polarization split layer 231 is tilted 45° with respect to the +X direction and the +Z direction. Specifically, the polarization split layer 231 is tilted 45° with respect to the X-Y plane and the Y-Z plane. Further, the polarization split layer 231 and the polarization split layer 221 are parallel to each other.

The polarization split layer 231 has a wavelength-selective polarization split characteristic of reflecting the blue light beam while reflecting the s-polarized light and transmitting the p-polarized light with respect to the light longer in wavelength than the blue light beam. Therefore, the second polarization split element 23 reflects the blue light beam BLp, which enters the second polarization split element 23 from the first polarization split element 22 along the +X direction, toward the −Z direction.

It should be noted that the second polarization split element 23 is not limited to the prism-type polarization split element, but can be a plate-type polarization split element having the polarization split layer 231.

Configuration of First Retardation Element

The first retardation element 24 is located at the −Z direction side of the first polarization split element 22. In other words, the first retardation element 24 is located between the first polarization split element 22 and the first reflecting element 26 in the +Z direction.

The first retardation element 24 is a ¼ wave plate, and the blue light beam BLs reflected by the first polarization split element 22 is converted by the first retardation element 24 into a blue light beam BLc1 as circularly polarized light, and then enters the first light collection element 25. In other words, the first retardation element 24 converts the polarization state of the blue light beam entering the first retardation element 24.

Configuration of First Light Collection Element

The first light collection element 25 is located at the −Z direction side of the first retardation element 24. In other words, the first light collection element 25 is located between the first retardation element 24 and the first reflecting element 26 in the −Z direction.

The first light collection element 25 converges the blue light beam BLc1 entering the first light collection element 25 from the first retardation element 24 on the first reflecting element 26. Further, the first light collection element 25 collimates the blue light beam BLc2 entering the first light collection element 25 from the first reflecting element 26. It should be noted that although the first light collection element 25 has a configuration including two lenses 251, 252 in the example shown in FIG. 4, the number of the lenses constituting the first light collection element 25 does not matter.

Configuration of First Reflecting Element

The first reflecting element 26 is located at the −Z direction side of the first light collection element 25. In other words, the first reflecting element 26 is located at the −Z direction side of the first light polarization split element 22.

The first reflecting element 26 diffusely reflecting the blue light beam BLc1, which enters the first reflecting element 26 from the first light collection element 25 in the −Z direction, toward the +Z direction. The first reflecting element 26 is provided with a reflecting plate 261 for reflecting the blue light beam BLc1 having entered the reflecting plate 261, and a rotating section 262 for rotating the reflecting plate 261 centering on a rotational axis Rx parallel to the +Z direction.

The blue light beam BLc1 having entered the reflecting plate 261 is converted into the blue light beam BLc2 as circularly polarized light with an opposite rotational direction when being reflected by the reflecting plate 261.

The blue light beam BLc2 emitted from the first reflecting element 26 is collimated while passing through the first light collection element 25 in the +Z direction, and then enters the first retardation element 24 once again. Therefore, the blue light beam BLc2 entering the first retardation element 24 from the first light collection element 25 is converted by the first retardation element 24 not into the blue light beam BLs as the s-polarized light which enters the first retardation element 24 from the first polarization split element 22, but into the blue light beam BLp as the p-polarized light. The blue light beam BLp thus converted is transmitted through the first polarization split element 22 in the +Z direction, and then enters the first color separation element 29A.

Configuration of Second Light Collection Element

The second light collection element 27 is located at the −Z direction side of the second polarization split element 23. In other words, the second light collection element 27 is located between the second polarization split element 23 and the wavelength conversion element 28 in the +Z direction.

The second light collection element 27 converges the blue light beam BLp reflected toward the −Z direction by the second polarization split element 23 on the wavelength conversion element 28. Further, the second light collection element 27 collimates the yellow light beam YLn entering the second light collection element 27 from the wavelength conversion element 28. It should be noted that although the second light collection element 27 has a configuration including two lenses 271, 272 in the example shown in FIG. 4, the number of the lenses constituting the second light collection element 27 does not matter.

Configuration of Wavelength Conversion Element

The wavelength conversion element 28 is located at the −Z direction side of the second light collection element 27. In other words, the wavelength conversion element 28 is located at the −Z direction side of the second polarization split element 23.

The wavelength conversion element 28 is excited by the incident light, and emits a converted light beam as light having a wavelength different from the wavelength of the incident light. Specifically, the wavelength conversion element 28 is a reflective wavelength conversion element for emitting the converted light beam toward the opposite direction to the incident direction of the light. In other words, the wavelength conversion element 28 emits the converted light beam obtained by converting the wavelength of the incident light toward the opposite direction to the incident direction of the light.

In the present embodiment, the wavelength conversion element 28 includes a yellow phosphor which is excited by the blue light beam to emit the yellow light beam, and the wavelength conversion element 28 emits the yellow light beam YLn, which is fluorescence having a wavelength longer than the wavelength of the blue light beam BLp entering the wavelength conversion element 28 in the −Z direction, toward the +Z direction as the converted light beam.

The yellow light beam YLn is light having a peak wavelength in a range of, for example, 500 nm through 700 nm, and is unpolarized light. In other words, the yellow light beam YLn is light including a green light component as a first color component and a red light component as a second color component, wherein the s-polarized light and the p-polarized light are mixed with each other in each of the components.

It should be noted that the light source device 2A can be provided with a rotating device for rotating the wavelength conversion element 28 centering on a rotational axis parallel to the +Z direction. In this case, it is possible to increase the heat radiation efficiency of the wavelength conversion element 28.

The yellow light beam YLn emitted toward the +Z direction from the second light collection element 27 enters the second polarization split element 23.

The polarization split layer 231 of the second polarization split element 23 has the wavelength-selective polarization split characteristic as described above. Therefore, out of the yellow light beam YLn having entered the polarization split layer 231, the yellow light beam YLs as the s-polarized light is reflected toward the −X direction by the polarization split layer 231, and then enters the first polarization split element 22. The polarization split layer 221 of the first polarization split element 22 has the polarization split characteristic of reflecting the yellow light beam YLs as the s-polarized light as described above. Therefore, the yellow light beam YLs having entered the polarization split layer 221 in the −X direction is reflected toward the +Z direction by the first polarization split element 22, and then enters the first color separation element 29A.

In contrast, out of the yellow light beam YLn having entered the polarization split layer 231, the yellow light beam YLp as the p-polarized light is transmitted toward the +Z direction through the polarization split layer 231, and then enters the third retardation element 32.

Configuration of First Color Separation Element

Figure 5:
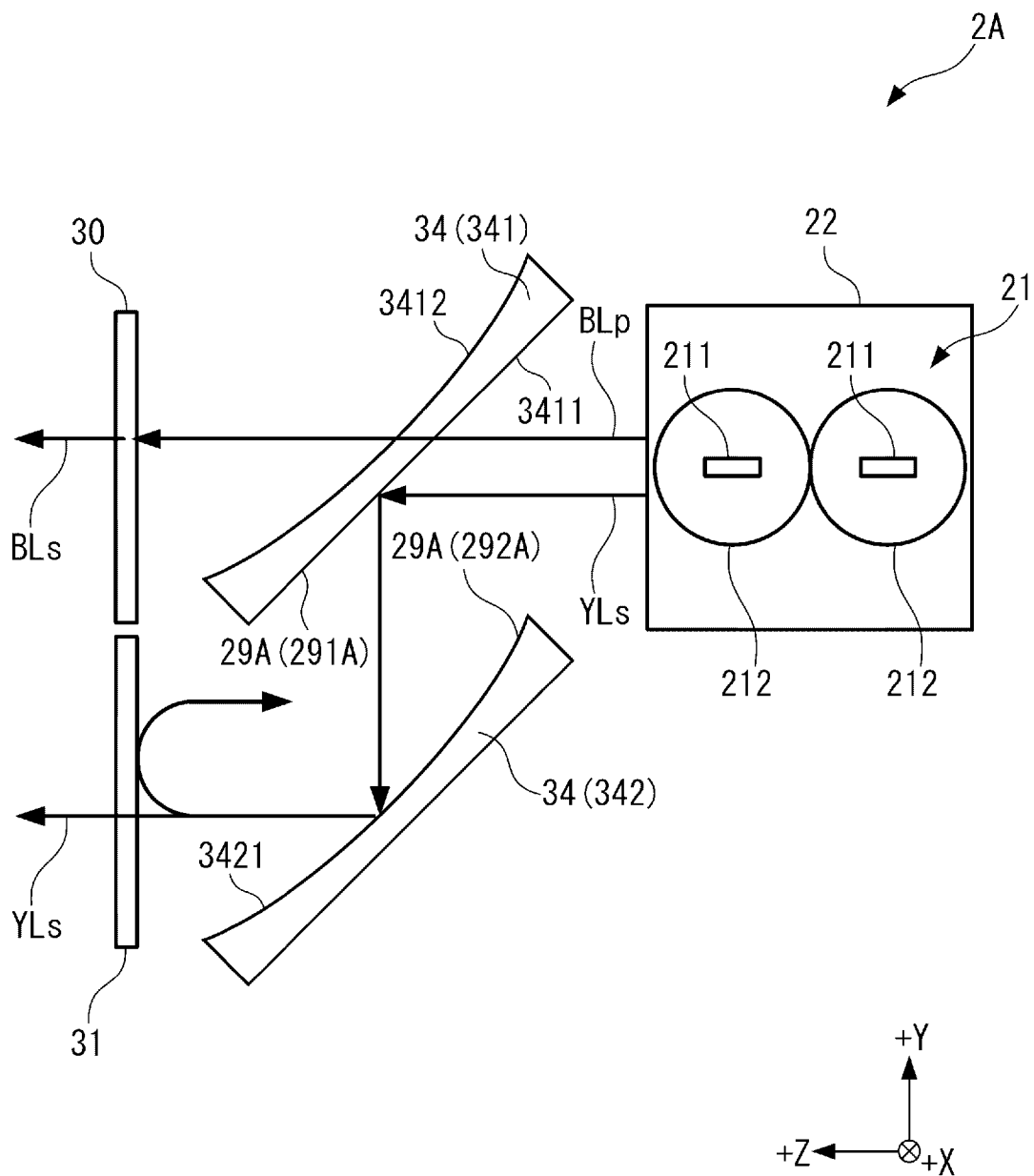
FIG. 5 is a schematic diagram of the light source device according to the first embodiment viewed from a −X direction.

FIG. 5 is a schematic diagram of the light source device 2A viewed from the −X direction. In other words, FIG. 5 is a schematic diagram of the first color separation element 29A, the second retardation element 30, the second reflecting element 31, and the adjusting element 34 viewed from the −X direction. It should be noted that in FIG. 5, illustration of the rotary retardation device 213, the first retardation element 24, the first light collection element 25, and the first reflecting element 26 is omitted.

The first color separation element 29A is located at the +Z direction side of the first polarization split element 22, and separates the blue light beam BLp and the yellow light beam YLs from the light entering the first color separation element 29A from the first polarization split element 22.

As shown in FIG. 5, the first color separation element 29A has a first color separation layer 291A and a first reflecting layer 292A.

The first color separation layer 291A transmits the blue light beam out of the incident light toward the +Z direction, and reflects the colored light beams longer in wavelength than the blue light beam BLs toward the −Y direction. Therefore, the first color separation layer 291A transmits the blue light beam BLp entering the first color separation layer 291A from the first polarization split element 22 toward the +Z direction, and reflects the yellow light beam YLs entering the first color separation layer 291A from the first polarization split element 22 toward the −Y direction.

The first reflecting layer 292A is located at the −Y direction side of the first color separation layer 291A, and reflects the yellow light beam YLs, which enters the first reflecting layer 292A in the −Y direction from the first color separation layer 291A, toward the +Z direction. The yellow light beam YLs reflected by the first reflecting layer 292A enters the second reflecting element 31.

Although described later in detail, the first color separation layer 291A is disposed on a plane of incidence of light 3411 of a first adjusting element 341 constituting the adjusting element 34, and the first reflecting layer 292A is disposed on a plane of incidence of light 3421 of a second adjusting element 342 constituting the adjusting element 34.

Configuration of Second Retardation Element

The second retardation element 30 is located at the +Z direction side of the first color separation layer 291A, and in a light path of the blue light beam BLp having passed through the first color separation layer 291A and the first adjusting element 341. The second retardation element 30 is a ½ wave plate for converting the polarization direction of the incident light, and the blue light beam BLp having entered the second retardation element 30 is converted into the blue light beam BLs as the s-polarized light.

The blue light beam BLs having been converted by the second retardation element 30 into the s-polarized light is emitted from the light source device 2A toward the +Z direction, and then enters the homogenization device 4. In other words, the light source device 2A emits the blue light beam BLs as the first colored light beam.

Configuration of Second Reflecting Element

The second reflecting element 31 is located at the +Z direction side of the first reflecting layer 292A, and in the light path of the yellow light beam YLs having been reflected by the first reflecting layer 292A. The second reflecting element 31 transmits a part of the incident light, and reflects the rest of the incident light.

A part of the yellow light beam YLs having entered the second reflecting element 31 is transmitted through the second reflecting element 31, and then enters the homogenization device 4. In other words, the yellow light beam YLs is spatially separated from the blue light beam BLs, and is emitted to the homogenization device 4 from an exit position different from the exit position of the blue light beam BLs in the light source device 2A. Specifically, the light source device 2A emits the yellow light beam YLs as the second colored light beam from the exit position on the −Y direction side of the exit position of the blue light beam BLs.

The rest of the yellow light beam YLs having entered the second reflecting element 31 is reflected by the second reflecting element 31, and then enters the first reflecting layer 292A once again. The rest of the yellow light beam YLs having entered the first reflecting layer 292A is reflected toward the +Y direction, and then enters the wavelength conversion element 28 via the first color separation layer 291A, the first polarization split element 22, the second polarization split element 23, and the second light collection element 27.

Here, the yellow phosphor included in the wavelength conversion element 28 hardly absorbs the yellow light beam having entered the wavelength conversion element 28 from the outside. Therefore, the yellow light beam YLs having entered the wavelength conversion element 28 is repeatedly reflected inside the wavelength conversion element 28 to thereby turn to the yellow light beam YLn as unpolarized light, and is then emitted to the outside of the wavelength conversion element 28 together with the yellow light beam YLn generated in the yellow phosphor. Then, the yellow light beam YLn having been emitted from the wavelength conversion element 28 enters the second polarization split element 23 via the second light collection element 27 as described above.

It should be noted that the second reflecting element can be formed of, for example, a half mirror, but the ratio between the light intensity of the yellow light beam YLs transmitted through the second reflecting element 31 and the light intensity of the yellow light beam YLs reflected by the second reflecting element 31 can arbitrarily be set. Further, the second reflecting element 31 can be eliminated.

Configuration of Third Retardation Element

As shown in FIG. 4, the third retardation element 32 is located at the +Z direction side of the second polarization split element 23. The yellow light beam YLp having been transmitted through the second polarization split element 23 toward the +Z direction enters the third retardation element 32.

The third retardation element 32 is a ½ wave plate for converting the yellow light beam YLp having entered the third retardation element 32 into the yellow light beam YLs as the s-polarized light. The yellow light beam YLs thus converted enters the second color separation element 33A.

Configuration of Second Color Separation Element

Figure 6:
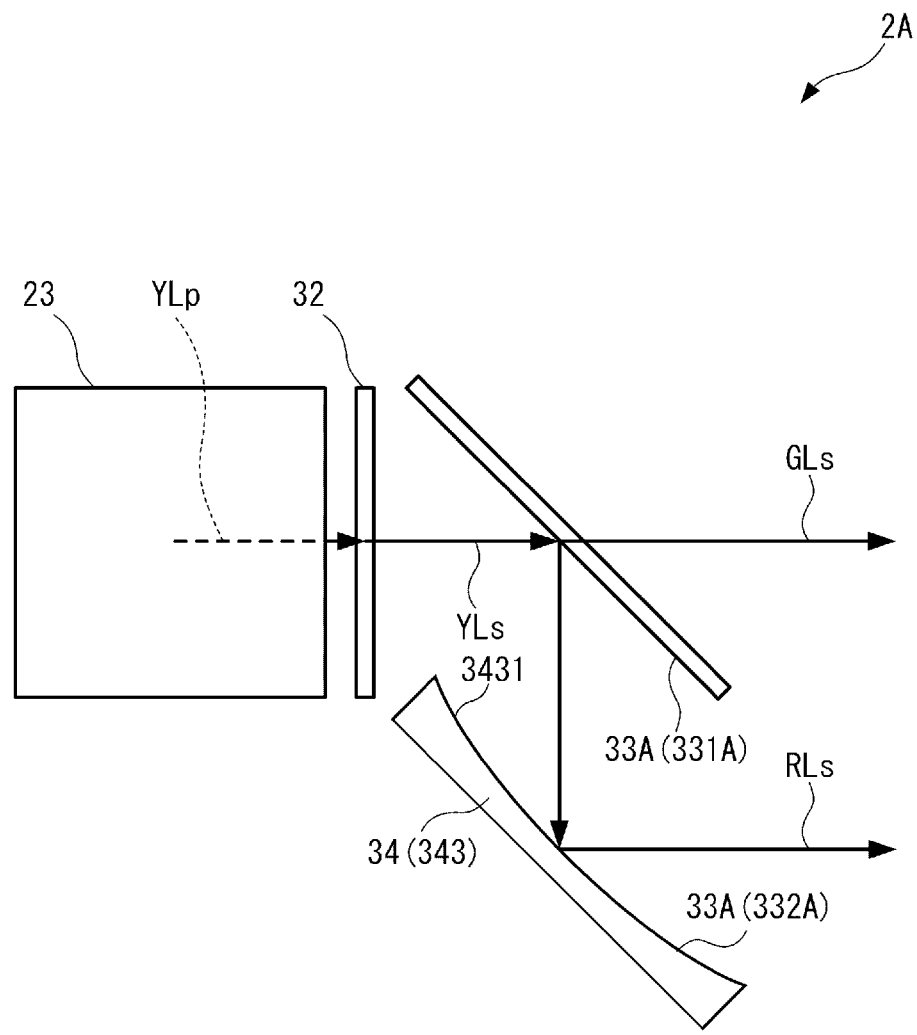
FIG. 6 is a schematic diagram of the light source device according to the first embodiment viewed from a +X direction.

FIG. 6 is a schematic diagram of the light source device 2A viewed from the +X direction. In other words, FIG. 6 is a schematic diagram of the second color separation element 33A and the adjusting element 34 viewed from the +X direction. It should be noted that in FIG. 6, illustration of the second light collection element 27 and the wavelength conversion element 28 is omitted.

As shown in FIG. 4 and FIG. 6, the second color separation element 33A is located at the +Z direction side of the third retardation element 32. The second color separation element 33A separates the green light component as the first color component and the red light component as the second color component from the yellow light beam YLs entering the second color separation element 33A from the third retardation element 32.

As shown in FIG. 6, the second color separation element 33A has a second color separation layer 331A and a second reflecting layer 332A.

The second color separation layer 331A transmits the green light beam toward the +Z direction and reflects the red light beam toward the −Y direction out of the incident light. Therefore, out of the yellow light beam YLs having entered the second color separation layer 331A, the green light beam GLs as the first color component is transmitted through the second color separation layer 331A toward the +Z direction, and then enters the homogenization device 4. Specifically, the light source device 2A emits the green light beam GLs as the third colored light beam from the exit position on the +X direction side of the exit position of the blue light beam BLs.

In contrast, out of the yellow light beam YLs having entered the second color separation layer 331A, the red light beam RLs as the second color component is reflected by the second color separation layer 331A toward the −Y direction.

It should be noted that the second color separation layer 331A is provided to a light transmissive substrate shaped like a flat plate in the present embodiment. In other words, the second color separation layer 331A can be formed of a dichroic mirror.

The second reflecting layer 332A reflects the red light beam RLs, which enters the second reflecting layer 332A in the −Y direction from the second color separation layer 331A, toward the +Z direction. The red light beam RLs reflected by the second reflecting layer 332A enters the homogenization device 4. Specifically, the light source device 2A emits the red light beam RLs as the fourth colored light beam from the exit position on the −Y direction side of the exit position of the green light beam GLs.

The second reflecting layer 332A is provided to a plane of incidence of light 3431 of the third adjusting element 343.

Configuration of Adjusting Element

As shown in FIG. 5 and FIG. 6, the adjusting element 34 adjusts the beam diameter of the incident light. Specifically, the adjusting element 34 is disposed in a light path of a target colored light beam which has the peak wavelength outside a reference wavelength range as a wavelength range set in advance, and the beam diameter of which is to be adjusted, and adjusts the beam diameter of the target colored light beam.

In the present embodiment, the reference wavelength range is a range within the wavelength region of the green light beam, and the reference colored light beam as the colored light beam having the peak wavelength in the reference wavelength range is the green light beam. Therefore, the adjusting element 34 is not disposed in the light path of the green light beam as the reference colored light beam out of the blue light beam, the yellow light beam, the green light beam, and the red light beam emitted by the light source device 2A. In other words, the adjusting element 34 includes the first adjusting element 341 disposed in the light path of the blue light beam as the first colored light beam, the second adjusting element 342 disposed in the light path of the yellow light beam as the second colored light beam, and a third adjusting element 343 disposed in the light path of the red light beam as the fourth colored light beam.

As shown in FIG. 5, the first adjusting element 341 is disposed in the light path of the blue light beam BLp which is separated by the first color separation layer 291A, and has the peak wavelength shorter than the lower limit value of the reference wavelength range, and the blue light beam BLp passes through the first adjusting element 341.

The first adjusting element 341 is a plano-concave lens having a plane of incidence of light 3411 as a flat surface facing to the −Y direction and the −Z direction, and a light exit surface 3412 as a concavely curved surface facing to the +Y direction and the +Z direction. In other words, the first adjusting element 341 is a diameter expansion element for expanding the beam diameter of the blue light beam BLp entering the first adjusting element 341, and the blue light beam BLp is expanded in diameter by passing through the first adjusting element 341. It should be noted that the blue light beam BLp having passed through the first adjusting element 341 enters the second retardation element 30 described above.

In the present embodiment, the first color separation layer 291A described above is provided to the plane of incidence of light 3411. In other words, the first color separation layer 291A and the first adjusting element 341 are integrated with each other.

The second adjusting element 342 is disposed in the light path of the yellow light beam YLs which is separated by the first color separation layer 291A, and includes the red light beam RLs having a peak wavelength longer than the upper limit value of the reference wavelength range.

The second adjusting element 342 has a plane of incidence of light 3421 as a concavely curved surface facing to the +Y direction and the +Z direction. In the present embodiment, the first reflecting layer 292A described above is provided to the plane of incidence of light 3421, and the second adjusting element 342 is configured as a concave mirror which is a diameter reduction element. In other words, the first reflecting layer 292A and the second adjusting element 342 are integrated with each other.

The second adjusting element 342 reduces the diameter of the yellow light beam YLs due to the shape of the plane of incidence of light 3421 when the yellow light beam YLs separated by the first color separation layer 291A is reflected by the first reflecting layer 292A. The yellow light beam YLs reflected by the first reflecting layer 292A enters the second reflecting element 31 described above.

Here, as described above, the plane of incidence of light 3411 to which the first color separation layer 291A is provided in the first adjusting element 341 is a flat surface. In other words, the first adjusting element 341 is the plano-concave lens wherein the plane of incidence of light 3411 to which the first color separation layer 291A is provided is a flat surface, and the light exit surface 3412 is a concavely curved surface. This is for making it easy to perform the adjustment of the beam diameter of each of the colored light beams by performing the adjustment of the beam diameter of the blue light beam BLp and the adjustment of the beam diameter of the yellow light beam YLs by the first adjusting element 341 and the second adjusting element 342 independently of each other.

On the other hand, it is also possible to adopt a configuration in which the first adjusting element 341 is formed of a biconcave lens, the beam diameter of the blue light beam BLp passing through the first color separation layer 291A is adjusted by the first adjusting element 341, and the beam diameter of the yellow light beam YLs is adjusted in accordance with the shape of the plane of incidence of light 3411 as a concavely curved surface concaved toward the −Z direction when the yellow light beam YLs is reflected by the first color separation layer 291A provided to the plane of incidence of light 3411. In this case, the second adjusting element 342 can be eliminated. In this case, it is sufficient to dispose a reflecting member for reflecting the incident light in the −Y direction toward the +Z direction instead of the second adjusting element 342. As the reflecting member, it is possible to use a reflecting mirror shaped like a flat plate.

As shown in FIG. 6, the third adjusting element 343 is disposed in a light path of the red light beam RLs which is separated by the second color separation layer 331A, and has a peak wavelength longer than the upper limit value of the reference wavelength range described above.

Similarly to the second adjusting element 342, the third adjusting element 343 has a plane of incidence of light 3431 as a concavely curved surface facing to the +Y direction and the +Z direction. In the present embodiment, the second reflecting layer 332A described above is provided to the plane of incidence of light 3431, and the third adjusting element 343 is configured as a concave mirror which is a diameter reduction element. In other words, the second reflecting layer 332A and the third adjusting element 343 are integrated with each other.

The third adjusting element 343 reduces the diameter of the red light beam RLs due to the shape of the plane of incidence of light 3431 when the red light beam RLs separated by the second color separation layer 331A is reflected by the second reflecting layer 332A. The red light beam RLs reflected by the second reflecting layer 332A is emitted from the light source device 2A as the fourth colored light beam as described above.

Function of Adjusting Element

Figure 7:
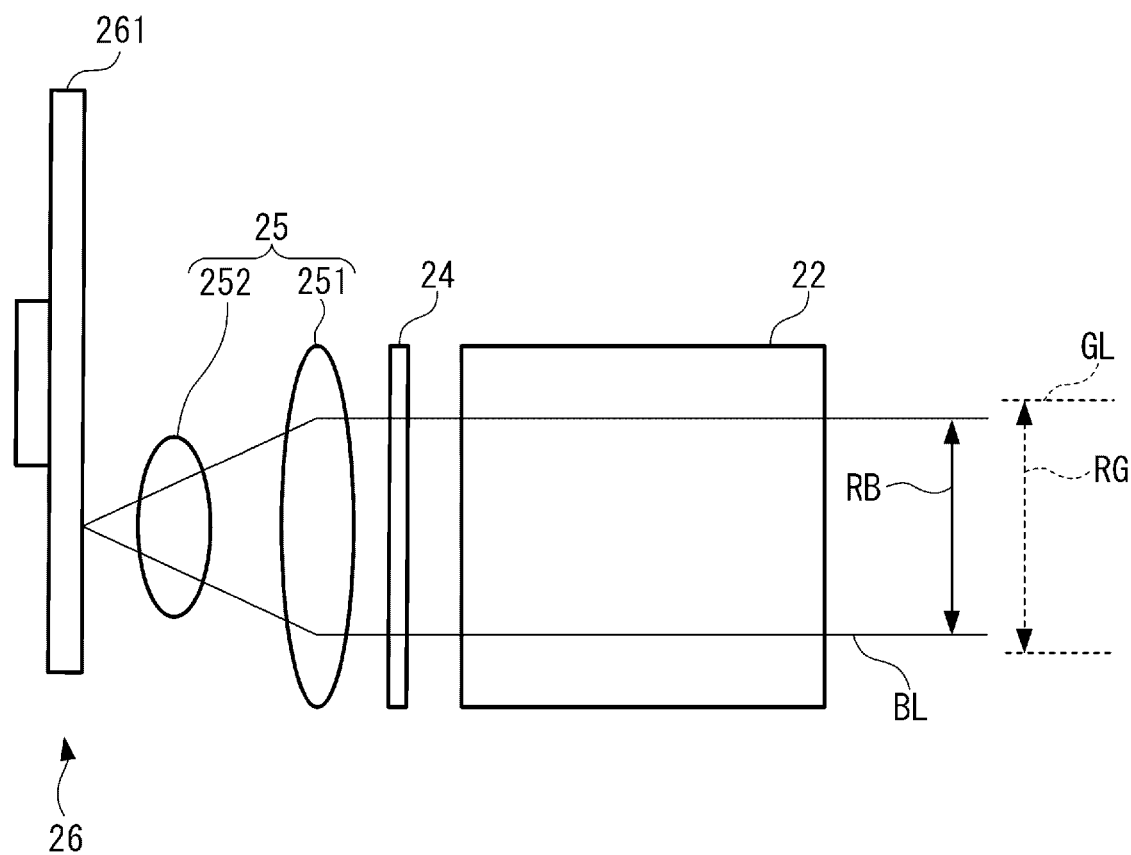
FIG. 7 is a schematic diagram showing a beam diameter of a blue light beam which has been reflected by a first reflecting element and then passed through a first light collection element in the first embodiment.

FIG. 7 is a schematic diagram showing the beam diameter of the blue light beam BL which has been reflected by the first reflecting element 26 and then passed through the first light collection element 25. It should be noted that a beam diameter RG of the green light beam GL shown in FIG. 7 is illustrated for the sake of comparison with a beam diameter RB of the blue light beam BL.

Here, the reflecting plate 261 of the first reflecting element 26 has a diffuse reflection characteristic approximate to the Lambertian reflection. However, as shown in FIG. 7, it is difficult to make the diffusion angle of the blue light beam BL reflected by the reflecting plate 261 the same as the diffusion angle of the yellow light beam diffused and emitted by the wavelength conversion element 28, and the diffusion angle of the blue light beam BL by the reflecting plate 261 is apt to become smaller than the diffusion angle of the green light beam GL included in the yellow light beam emitted from the wavelength conversion element 28. When the diffusion angle of the blue light beam BL is smaller than the diffusion angle of the green light beam GL, the beam diameter RB of the blue light beam BL which is reflected by the reflecting plate 261 and is then emitted from the first light collection element 25 becomes smaller than the beam diameter RG of the green light beam GL emitted from the wavelength conversion element 28.

Figure 8:
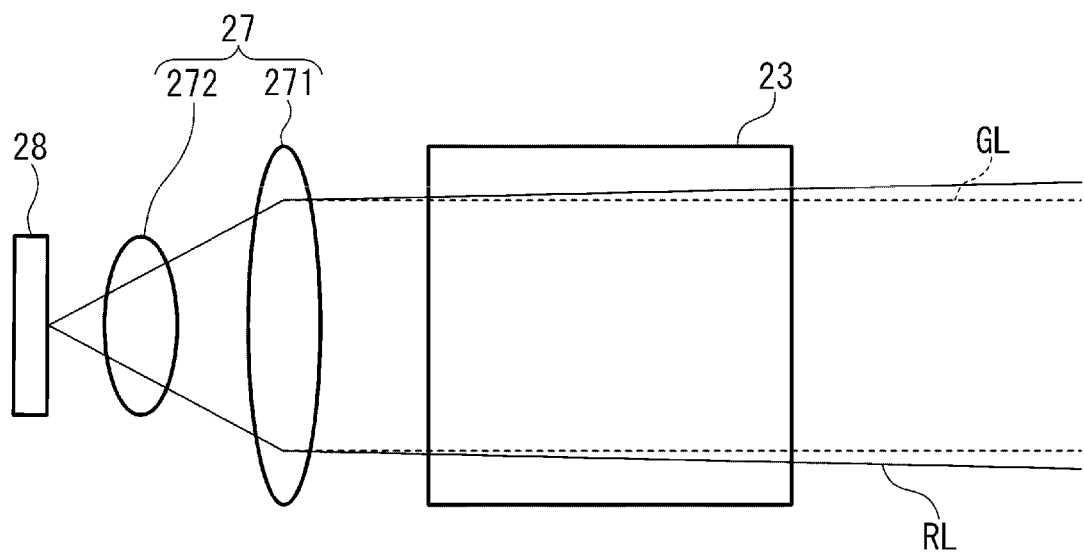
FIG. 8 is a schematic diagram showing a beam diameter of a green light beam and a beam diameter of a red light beam, wherein the green light beam and the red light beam have been emitted from a wavelength conversion element and then passed through a second light collection element in the first embodiment.
Figure 8:
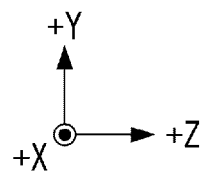

FIG. 8 is a schematic diagram showing the beam diameter of the green light beam GL and the beam diameter of the red light beam RL, wherein the green light beam GL and the red light beam RL have been emitted from the wavelength conversion element 28 and then passed through the second light collection element 27.

Here, in the present embodiment, the wavelength conversion element 28 is disposed at the focal point of the second light collection element 27. Specifically, the wavelength conversion element 28 is disposed at the anterior focal point in the green light beam of the second light collection element 27 which the yellow light beam enters from the wavelength conversion element 28. In other words, the wavelength conversion element 28 is disposed at the anterior focal point of the second light collection element 27 in the green light beam as the reference colored light beam described above.

Therefore, the green light beam GL included in the yellow light beam which enters the second light collection element 27 from the wavelength conversion element 28 is collimated by the second light collection element 27. In contrast, the red light beam RL included in the yellow light beam is slightly expanded in diameter due to the influence of the color aberration of the second light collection element 27. In other words, the beam diameter of the red light beam RL emitted from the second light collection element 27 becomes larger than the beam diameter of the green light beam GL emitted from the second light collection element 27.

Figure 9:
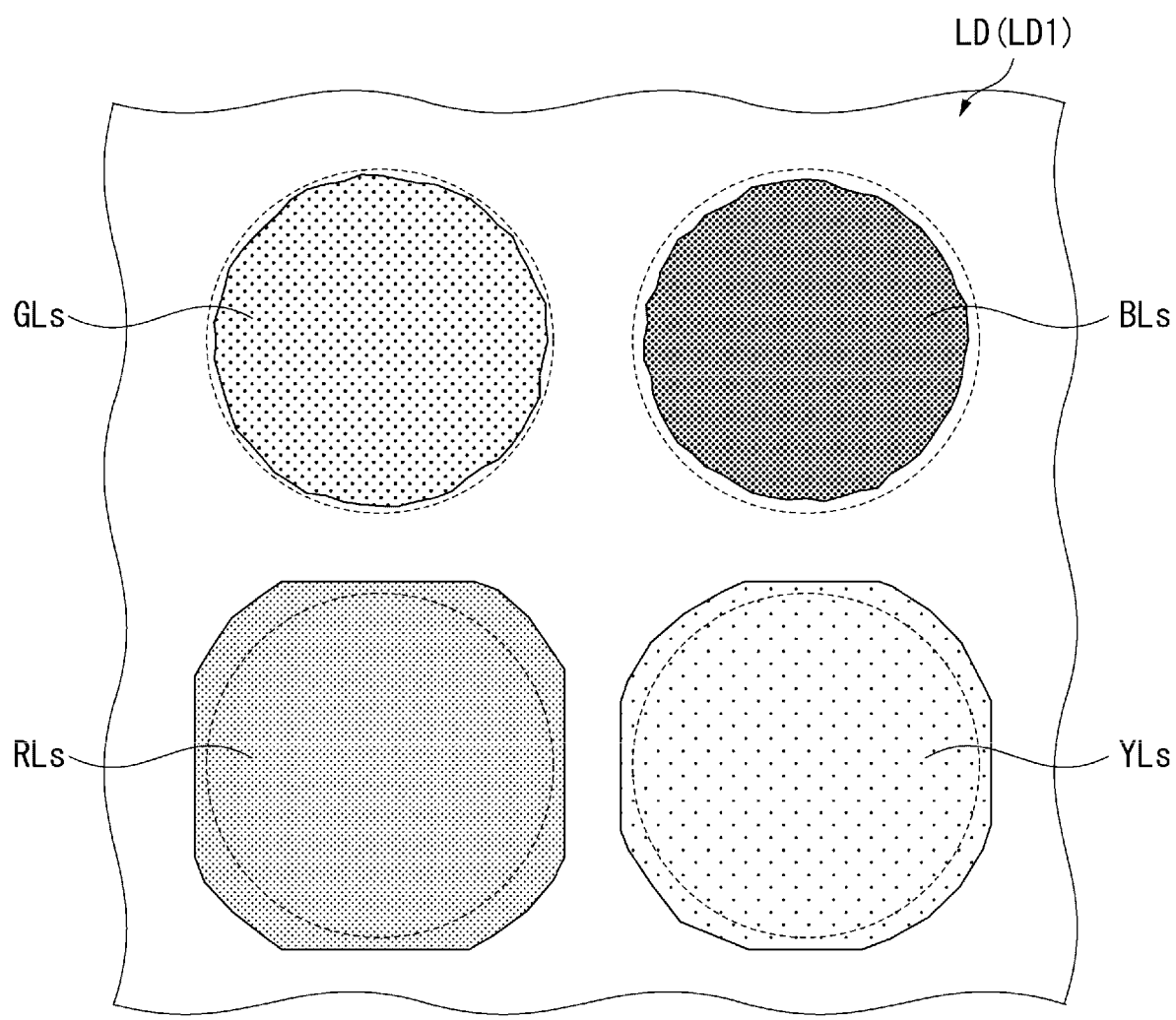
FIG. 9 is a schematic diagram showing beam diameters of respective colored light beams emitted from a light source device not provided with an adjusting element in the first embodiment.

FIG. 9 is a diagram of an exit surface LD1 of a light source device LD not provided with the adjusting element 34 viewed from the +Z direction, and is a schematic diagram showing beam diameters of respective colored light beams emitted from the light source device LD. It should be noted that in FIG. 9, an outer edge of the flux of the green light beam GLs is represented by the dotted line.

Here, the beam diameters of the respective colored light beams emitted from the light source device LD not provided with the adjusting element 34 will be described with reference to FIG. 9. It should be noted that the light source device LD is provided with substantially the same constituents as those of the light source device 2A except the point that the adjusting element 34 is not provided. Specifically, the light source device LD is not provided with the adjusting elements 341 through 343, and in the light source device LD, the first color separation layer 291A, the first reflecting layer 292A, and the second reflecting layer 332A are provided to the light transmissive substrate shaped like a flat plate similarly to the second color separation layer 331A.

Similarly to the light source device 2A, the light source device LD emits the blue light beam BLs, the yellow light beam YLs, the green light beam GLs, and the red light beam RLs spatially separated from each other. Specifically, as shown in FIG. 9, the light source device LD emits the blue light beam BLs from an exit position on the −X direction side and on the +Y direction side in the exit surface LD1, and emits the yellow light beam YLs from an exit position on the −X direction side and on the −Y direction side. Further, the light source device LD emits the green light beam GLs from an exit position on the +X direction side and on the +Y direction side in the exit surface LD1, and emits the red light beam RLs from an exit position on the +X direction side and on the −Y direction side.

As described above, the beam diameter of the blue light beam which is reflected by the reflecting plate 261 and is emitted from the first light collection element 25 is smaller than the beam diameter of the green light beam emitted from the second light collection element 27. Therefore, the beam diameter of the blue light beam BLs emitted from the light source device LD is smaller than the beam diameter of the green light beam GLs emitted from the light source device LD.

Further, the beam diameter of the red light beam emitted from the second light collection element 27 is larger than the beam diameter of the green light beam emitted from the second light collection element 27. Therefore, the beam diameter of the red light beam RLs emitted from the light source device LD is larger than the beam diameter of the green light beam GLs emitted from the light source device LD. Further, the beam diameter of the yellow light beam YLs which includes the red light beam RLs and is emitted from the light source device LD is larger than the beam diameter of the green light beam GLs emitted from the light source device LD.

When the colored light beams having such beam diameters enter the corresponding areas A1 through A4 in the multi-lens 41, there arises a possibility that the number of the lenses 411 which the colored light beam enters becomes different between the areas A1 through A4, and thus, the numbers of the partial light beams emitted from the respective areas A1 through A4 become different from each other. In this case, the superimposing performance of the colored light beams on the light modulation device 6 by the multi-lens 42 and the superimposing lens 43 deteriorates, and in some cases, there occurs an illuminance variation in the light modulation device 6, and by extension, a color variation in the image to be formed by the light modulation device 6 and then projected by the projection optical device 7.

Therefore, it is preferable to make the corresponding colored light beams enter the areas A1 through A4 in the multi-lens 41 in the same condition. In other words, it is preferable to make the colored light beams the same in beam diameter as each other enter the areas A1 through A4.

In contrast, in the present embodiment, the green light beam is defined as the reference colored light beam, and as shown in FIG. 5, the first adjusting element 341 is disposed in the light path of the blue light beam BLp which has the peak wavelength shorter than the lower limit value of the reference wavelength range included in the wavelength region of the green light beam, and is separated by the first color separation element 29A. Further, the second adjusting element 342 is disposed in the light path of the yellow light beam YLs which includes the red light beam RLs having the peak wavelength longer than the upper limit value of the reference wavelength range, and is separated by the first color separation element 29A. Further, as shown in FIG. 6, the third adjusting element 343 is disposed in the light path of the red light beam RLs which has the peak wavelength longer than the lower limit value of the reference wavelength range, and is separated by the second color separation element 33A.

Figure 10:
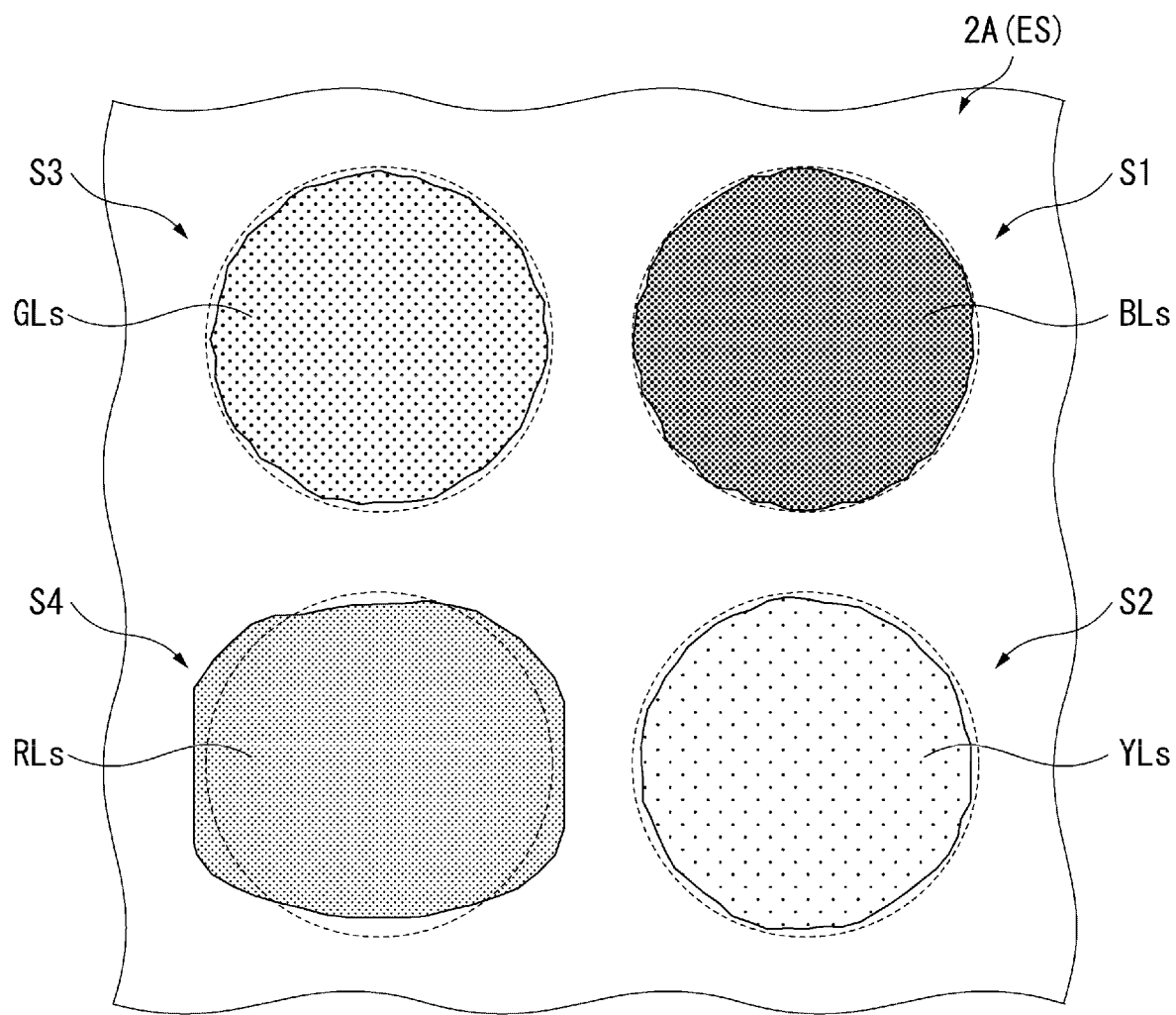
FIG. 10 is a schematic diagram showing beam diameters of respective colored light beams emitted from the light source device according to the first embodiment.

FIG. 10 is a diagram of an exit surface ES of the light source device 2A viewed from the +Z direction, and is a schematic diagram showing beam diameters of the respective colored light beams emitted from the light source device 2A. It should be noted that in FIG. 10, the outer edge of the flux of the green light beam GLs is represented by the dotted line.

The first adjusting element 341 is the diameter expansion element as described above, and expands the blue light beam BLp entering the first adjusting element 341 in beam diameter so as to turn to a colored light beam substantially the same in beam diameter as the green light beam GLs as the reference colored light beam. Therefore, the blue light beam BLp separated by the first color separation element 29A enters the first adjusting element 341 to thereby turn to the colored light beam substantially the same in beam diameter as the green light beam GLs. Then, the blue light beam BLp thus expanded in beam diameter is converted by the second retardation element 30 into the blue light beam BLs, and is then emitted from the light source device 2A as the first colored light beam.

It should be noted that a first exit position S1 where the blue light beam BLs is emitted is a position on the −X direction side and on the +Y direction side in the exit surface ES of the light source device 2A, and a third exit position S3 where the green light beam GLs is emitted is a position on the +X direction side and on the +Y direction side in the exit surface ES.

The second adjusting element 342 is the diameter reduction element as described above, and reduces the yellow light beam YLs entering the second adjusting element 342 in beam diameter so as to turn to a colored light beam substantially the same in beam diameter as the green light beam GLs as the reference colored light beam. Therefore, the yellow light beam YLs separated by the first color separation layer 291A is reflected by the first reflecting layer 292A provided to the second adjusting element 342 to thereby turn to the colored light beam substantially the same in beam diameter as the green light beam GLs. Then, a part of the yellow light beam YLs thus reduced in beam diameter passes through the second reflecting element 31 to thereby be emitted from the light source device 2A as the second colored light beam.

It should be noted that a second exit position S2 where the yellow light beam YLs is emitted is a position on the −X direction side and on the −Y direction side in the exit surface ES.

The third adjusting element 343 is the diameter reduction element as described above, and reduces the red light beam RLs entering the third adjusting element 343 in beam diameter so as to turn to a colored light beam substantially the same in beam diameter as the green light beam GLs as the reference colored light beam. Therefore, the red light beam RLs separated by the second color separation layer 331A is reflected by the second reflecting layer 332A provided to the third adjusting element 343 to thereby turn to the colored light beam substantially the same in beam diameter as the green light beam GLs, and is then emitted from the light source device 2A as the fourth colored light beam.

It should be noted that a fourth exit position S4 where the red light beam RLs is emitted is a position on the +X direction side and on the −Y direction side in the exit surface ES.

As described above, the respective beam diameters of the blue light beam BLs, the yellow light beam YLs, the green light beam GLs, and the red light beam RLs emitted from the light source device 2A and then entering the multi-lens 41 substantially coincide with each other. Thus, it is possible to uniform the numbers of the partial light beams of the respective colored light beams generated in the multi-lens 41, and thus, it is possible to prevent the deterioration of the superimposing performance of the colored light beams on the light modulation device 6 by the multi-lens 42 and the superimposing lens 43. Therefore, it is possible to prevent the illumination variation in the light modulation device 6 from occurring, and thus, it is possible to prevent the color variation from occurring in the image to be formed by the light modulation device 6 and then projected by the projection optical device 7.

Advantages of First Embodiment

According to the projector 1 related to the present embodiment described hereinabove, the following advantages can be exerted.

The light source device 2A for emitting the light in the +Z direction has the first exit position S1 from which the blue light beam BLs as the first colored light beam is emitted, the second exit position S2 which is located at the −Y direction side of the first exit position S1 and from which the yellow light beam YLs as the second colored light beam is emitted, the third exit position S3 which is located at the +X direction side of the first exit position S1 and from which the green light beam GLs as the third colored light beam is emitted, and the fourth exit position S4 which is located at the −Y direction side of the third exit position S3 and from which the red light beam RLs as the fourth colored light beam is emitted.

It should be noted that the +Z direction corresponds to the first direction, and the −Y direction and the +X direction as the two directions which are perpendicular to the +Z direction, and are perpendicular to each other correspond respectively to the second direction and the third direction.

Out of the colored light beams described above, the blue light beam BLs, the yellow light beam YLs, and the red light beam RLs are each the colored light beam having the peak wavelength out of the reference wavelength range included in the wavelength region of the green light beam, and are the target colored light beams to be adjusted in the beam diameter, and in the light path of each of the target colored light beams, there is disposed the adjusting element 34. As the adjusting element 34, there is used the diameter reduction element for reducing the beam diameter of the target colored light beam when the target colored light beam has a longer peak wavelength than the upper limit value of the reference wavelength range, and there is used the diameter expansion element for expanding the beam diameter of the target colored light beam when the target colored light beam has a shorter peak wavelength than the lower limit value of the reference wavelength range.

According to such a configuration, it is possible to uniform the beam diameters of the blue light beam BLs, the yellow light beam YLs, and the red light beam RLs emitted from the light source device 2A with the beam diameter of the green light beam GLs as the reference colored light beam. Therefore, it is possible to prevent the illuminance variation from occurring in the light modulation device 6 as when the beam diameters of the respective colored light beams emitted from the light source device LD and then entering the multi-lens 41 are different from each other. Therefore, it is possible to prevent the color variation from occurring in the image to be projected on the projection target surface.

The first adjusting element 341 as the diameter expansion element is a concave lens. According to such a configuration, it is possible to make it easy to uniform the beam diameter of the blue light beam BLp entering the first adjusting element 341 with the beam diameter of the green light beam GLs as the reference colored light beam.

The second adjusting element 342 and the third adjusting element 343 as the diameter reduction elements are each a concave mirror. According to such a configuration, it is possible to make it easy to uniform the beam diameter of the yellow light beam YLs entering the second adjusting element 342 and the beam diameter of the red light beam RLs entering the third adjusting element 343 with the beam diameter of the green light beam GLs as the reference colored light beam.

The first through fourth colored light beams emitted from the light source device 2A while being spatially separated from each other are the blue light beam BLs, the yellow light beam YLs, the green light beam GLs, and the red light beam RLs, respectively.

According to such a configuration, since it is possible to make the blue light beam BLs, the yellow light beam YLs, the green light beam GLs, and the red light beam RLs enter the light modulation device 6, it is possible to form a full-color image with the light modulation device 6. Further, since the yellow light beam YLs is included in the light entering the light modulation device 6, it is possible for the light modulation device 6 to form the image high in luminance.

The first colored light beam is the blue light beam BLs, and the second colored light beam is the yellow light beam YLs. The third colored light beam is the green light beam GLs, and the fourth colored light beam is the red light beam RLs.

According to such a configuration, it is possible to make it easy to make the corresponding colored light beams enter the sub-pixels SX1 through SX4 arranged as described above in each of the pixels PX of the liquid crystal panel 61 with the microlens array 62.

The reference wavelength range is included in the wavelength region of the green light beam. In the light path of the red light beam RLs, there is disposed the third adjusting element 343 as the diameter reduction element, and in the light path of the blue light beam BLs, there is disposed the first adjusting element 341 as the diameter expansion element.

Here, in the light source device to be used in the projector such as the light source device 2A, the outgoing light intensity of the green light beam is apt to be higher than the outgoing light intensity of the blue light beam and the outgoing light intensity of the red light beam. Further, the sensitivity of the eyes is higher to the green light beam compared to the blue light beam and the red light beam.

Therefore, by defining the reference wavelength range as a region included in the wavelength region of the green light, and reference colored light beam as the green light, and making the beam diameter of the red light beam RLs and the beam diameter of the blue light beam BLs coincide with the beam diameter of the green light beam GLs, it is possible to make it easy to uniform the beam diameters of the red light beam RLs, the blue light beam BLs, and the green light beam GLs emitted from the light source device 2A.

Here, the yellow light beam YLs includes the green light beam GLs and the red light beam RLs. For this reason, when defining the green light beam as the reference colored light beam, the beam diameter of the red light beam RLs is apt to be larger than the beam diameter of the green light beam GLs.

In contrast, in the light path of the yellow light beam YLs as the second colored light beam, there is disposed the second adjusting element 342 as the diameter reduction element. According to this configuration, it is possible to make it easy to uniform the beam diameter of the yellow light beam YLs with the beam diameter of the green light beam GLs as the reference colored light beam.

The light source device 2A has the first color separation element 29A and the second color separation element 33A. The first color separation element 29A separates the blue light beam BLp as the first colored light beam and the yellow light beam YLs as the second colored light beam from the light beam including the blue light beam BLp and the yellow light beam YLs. The second color separation element 33A separates the green light beam GLs as the third colored light beam and the red light beam RLs as the fourth colored light beam from the yellow light beam YLs including the green light beam GLs and the red light beam RLs.

According to such a configuration, since the blue light beam as the first colored light beam, the yellow light beam as the second colored light beam, the green light beam as the third colored light beam, and the red light beam as the fourth colored light beam can be separated from each other, it is possible to emit the first through fourth colored light beams spatially separated from each other from the light source device 2A.

The first adjusting element 341 is disposed in the light path of the blue light beam BLp as the target colored light beam separated by the first color separation element 29A. The second adjusting element 342 is disposed in the light path of the yellow light beam YLs as the target colored light beam separated by the first color separation layer 291A. The third adjusting element 343 is disposed in the light path of the red light beam RLs as the target colored light beam separated by the second color separation element 33A.

According to such a configuration, it is possible to make the blue light beam BLs emitted from the light source device 2A become the colored light beam which is separated by the first color separation element 29A, and is adjusted in the beam diameter by the first adjusting element 341. Further, it is possible to make the yellow light beam YLs emitted from the light source device 2A become the colored light beam which is separated by the first color separation element 29A, and is adjusted in the beam diameter by the second adjusting element 342. Similarly, it is possible to make the red light beam RLs emitted from the light source device 2A become the colored light beam which is separated by the second color separation element 33A, and is adjusted in the beam diameter by the third adjusting element 343. Therefore, it is possible to surely adjust the beam diameters of the blue light beam, the yellow light beam, and the red light beam as the target colored light beams using the respective adjusting elements 341 through 343.

The first adjusting element 341 and the second adjusting element 342 are integrated with the first color separation element 29A. The third adjusting element 343 is integrated with the second color separation element 33A.

According to such a configuration, there is disposed no gap between the first color separation element 29A, and the first adjusting element 341 and the second adjusting element 342, and between the second color separation element 33A and the third adjusting element 343. Therefore, it is possible to prevent the light source device 2A from growing in size. Besides the above, there is no need to separately dispose a fixation member for fixing the first color separation element 29A, and a fixation member for fixing the first adjusting element 341 and the second adjusting element 342. Similarly, there is no need to separately dispose a fixation member for fixing the second color separation element 33A, and a fixation member for fixing the third adjusting element 343. Thus, it is possible to prevent the number of components of the light source device 2A from increasing.

The first color separation element 29A has the first color separation layer 291A which transmits the blue light beam BLp as the first colored light beam and reflects the yellow light beam YLs as the second colored light beam, and the first reflecting layer 292A which is located at the −Y direction side as the second direction side of the first color separation layer 291A, and reflects the yellow light beam YLs having been reflected by the first color separation layer 291A in parallel to the blue light beam BLp transmitted through the first color separation layer 291A. The second color separation element 33A has the second color separation layer 331A which transmits the green light beam GLs as the third colored light beam and reflects the red light beam RLs as the fourth colored light beam, and the second reflecting layer 332A which is located at the −Y direction side of the second color separation layer 331A, and reflects the red light beam RLs having been reflected by the second color separation layer 331A in parallel to the green light beam GLs transmitted through the second color separation layer 331A.

According to such a configuration, it is possible to emit the blue light beam as the first colored light beam and the yellow light beam as the second colored light beam in the spatially separated state from the light source device 2A. Similarly, it is possible to emit the green light beam as the third colored light beam and the red light beam as the fourth colored light beam in the spatially separated state from the light source device 2A. Therefore, it is possible for the light source device 2A to surely emit the blue light beam, the yellow light beam, the green light beam, and the red light beam spatially separated from each other.

The first color separation layer 291A is provided to the plane of incidence of light 3411 of the first adjusting element 341 disposed in the light path of the blue light beam as the first colored light beam. The first reflecting layer 292A is provided to the plane of incidence of light 3421 of the second adjusting element 342 disposed in the light path of the yellow light beam as the second colored light beam. The second reflecting layer 332A is provided to the plane of incidence of light 3431 of the third adjusting element 343 disposed in the light path of the red light beam as the fourth colored light beam.

According to such a configuration, it is possible to use the first adjusting element 341 as a support member for the first color separation layer 291A. Similarly, it is possible to use the second adjusting element 342 as a support member for the first reflecting layer 292A, and it is possible to use the third adjusting element 343 as a support member for the second reflecting layer 332A. Therefore, it is possible to prevent the number of components of the light source device 2A from increasing.

The light source device 2A has the light source section 21, the first polarization split element 22, the second polarization split element 23, the first retardation element 24, the first light collection element 25, the first reflecting element 26, the second light collection element 27, the wavelength conversion element 28, the second retardation element 30, the second reflecting element 31, and the third retardation element 32 in addition to the first color separation element 29A, the second color separation element 33A, and the adjusting element 34.

The light source section 21 emits the source light beam. The first polarization split element 22 transmits the blue light beam BLp as the first polarization component of the source light beam toward the +X direction, and reflects the blue light beam BLs as the second polarization component of the source light beam toward the −Z direction as the opposite direction to the first direction out of the source light beam which is emitted from the light source section 21 and then enters the first polarization split element 22 along the +X direction as the third direction. The second polarization split element 23 is located at the +X direction side of the first polarization split element 22, and reflects the blue light beam BLp, which enters the second polarization split element 23 in the +X direction, toward the −Z direction. The first reflecting element 26 is located at the −Z direction side of the first polarization split element 22, and reflects the source light beam entering the first reflecting element 26 toward the +Z direction. The first retardation element 24 is located between the first polarization split element 22 and the first reflecting element 26 in the +Z direction, and converts the polarization component of the source light beam. The wavelength conversion element 28 is located at the −Z direction side of the second polarization split element 23, and emits the yellow light beam YLn, which is the unpolarized converted light beam obtained by performing the wavelength conversion on the blue light beam BLp entering the wavelength conversion element 28 in the −Z direction, toward the +Z direction. The second retardation element 30 is the ½ wave plate located in the light path of the blue light beam BLp separated by the first color separation element 29A, and emits the blue light beam BLs obtained by converting the polarization direction of the blue light beam BLp. The third retardation element 32 is the ½ wave plate which is located at the +Z direction side of the second polarization split element 23, and which the yellow light beam YLp having been transmitted through the second polarization split element 23 enters.

The second polarization split element 23 transmits the yellow light beam YLp as the first polarization component of the yellow light beam YLn in the +Z direction to make the yellow light beam YLp enter the third retardation element 32, and reflects the yellow light beam YLs as the second polarization component of the yellow light beam YLn toward the −X direction out of the yellow light beam YLn entering the second polarization split element 23 in the +Z direction. The first polarization split element 22 transmits the blue light beam BLp, which is the first polarization component of the source light beam entering the first polarization split element 22 in the +Z direction, toward the +Z direction to make the blue light beam BLp enter the first color separation element 29A, and reflects the yellow light beam YLs entering the first polarization split element 22 in the −X direction toward the +Z direction to make the yellow light beam YLs enter the first color separation element 29A. The first color separation element 29A is located at the +Z direction side of the first polarization split element 22, emits the blue light beam BLp, which enters the first color separation element 29A from the first polarization split element 22, to the second retardation element 30, and emits the yellow light beam YLs entering the first color separation element 29A from the first polarization split element 22. The second color separation element 33A is located at the +Z direction side of the third retardation element 32, emits the green light beam GLs as the first color component included in the yellow light beam YLs entering the second color separation element 33A from the third retardation element 32, and emits the red light beam RLs as the second color component included in the yellow light beam YLs.

According to such a configuration, it is possible for the light source device 2A to emit the blue light beam BLs, the yellow light beam YLs, the green light beam GLs, and the red light beam RLs, each of which is the s-polarized light, as the first through fourth colored light beams. Therefore, it is possible to uniform the polarization direction of the colored light beams entering the liquid crystal panel 61 of the light modulation device 6 without using the polarization conversion element which uniforms the polarization direction of the incident light and then emits the result. Therefore, it is possible to achieve reduction in size of the light source device 2A, and by extension, the projector 1.

The illumination optical device 10 has the light source device 2A described above, the two multi-lenses 41, 42 for dividing the light entering the multi-lens 41 from the light source device 2A into the plurality of partial light beams, and the superimposing lens 43 for superimposing the plurality of partial light beams entering the superimposing lens 43 from the two multi-lenses 41, 42 on the arrangement position of the light modulation device 6 as a predetermined position.

According to such a configuration, substantially the same advantages as those of the light source device 2A described above can be obtained.

Besides the above, since the beam diameters of the first through fourth colored light beams entering the multi-lens 41 from the light source device 2A coincide with each other, the number of partial light beams divided by the multi-lens 41 becomes the same between the first through fourth colored light beams. Therefore, it is possible to prevent the illuminance variation from occurring in the image formation area of the light modulation device 6 on which the first through fourth colored light beams are superimposed by the multi-lens 42 and the superimposing lens 43, namely in the area where the pixels PX are arranged.

The projector 1 is provided with the illumination optical device 10, the light modulation device 6 for modulating the light entering the light modulation device 6 from the illumination optical device 10, and the projection optical device 7 for projecting the light modulated by the light modulation device 6. The light modulation device 6 is provided with the single liquid crystal panel 61 having the plurality of pixels PX, and the microlens array 62 having the plurality of microlenses 621 corresponding to the plurality of pixels PX, and located at the light incident side of the single liquid crystal panel 61. The pixels PX each have the first sub-pixel SX1, the second sub-pixel SX2, the third sub-pixel SX3, and the fourth sub-pixel SX4. The plurality of microlenses 621 makes the blue light beam BLs as the first colored light beam enter the first sub-pixels SX1, the yellow light beam YLs as the second colored light beam enter the second sub-pixels SX2, the green light beam GLs as the third colored light beam enter the third sub-pixels SX3, and the red light beam RLs as the fourth colored light beam enter the fourth sub-pixels SX4.

According to such a configuration, substantially the same advantages as those of the illumination optical device 10 described above can be obtained.

Besides the above, due to the microlenses 621, it is possible to make the plurality of colored light beams entering the light modulation device 6 enter the corresponding sub-pixels SX of the pixels PX in the liquid crystal panel 61. Therefore, it is possible to make the colored light beams emitted from the light source device 2A efficiently enter the sub-pixels SX, and thus, it is possible to increase the use efficiency of the colored light beams.

First Modified Example of First Embodiment

In the light source device 2A, it is assumed that the reference wavelength range is the range within the wavelength region of the green light beam, the reference colored light beam is the green light beam, and the blue light beam is expanded in beam diameter and the yellow light beam and the red light beam are reduced in beam diameter so as to coincide with the beam diameter of the green light beam. However, this is not a limitation, the reference wavelength range can be a range within the wavelength region of another colored light beam.

Figure 11:
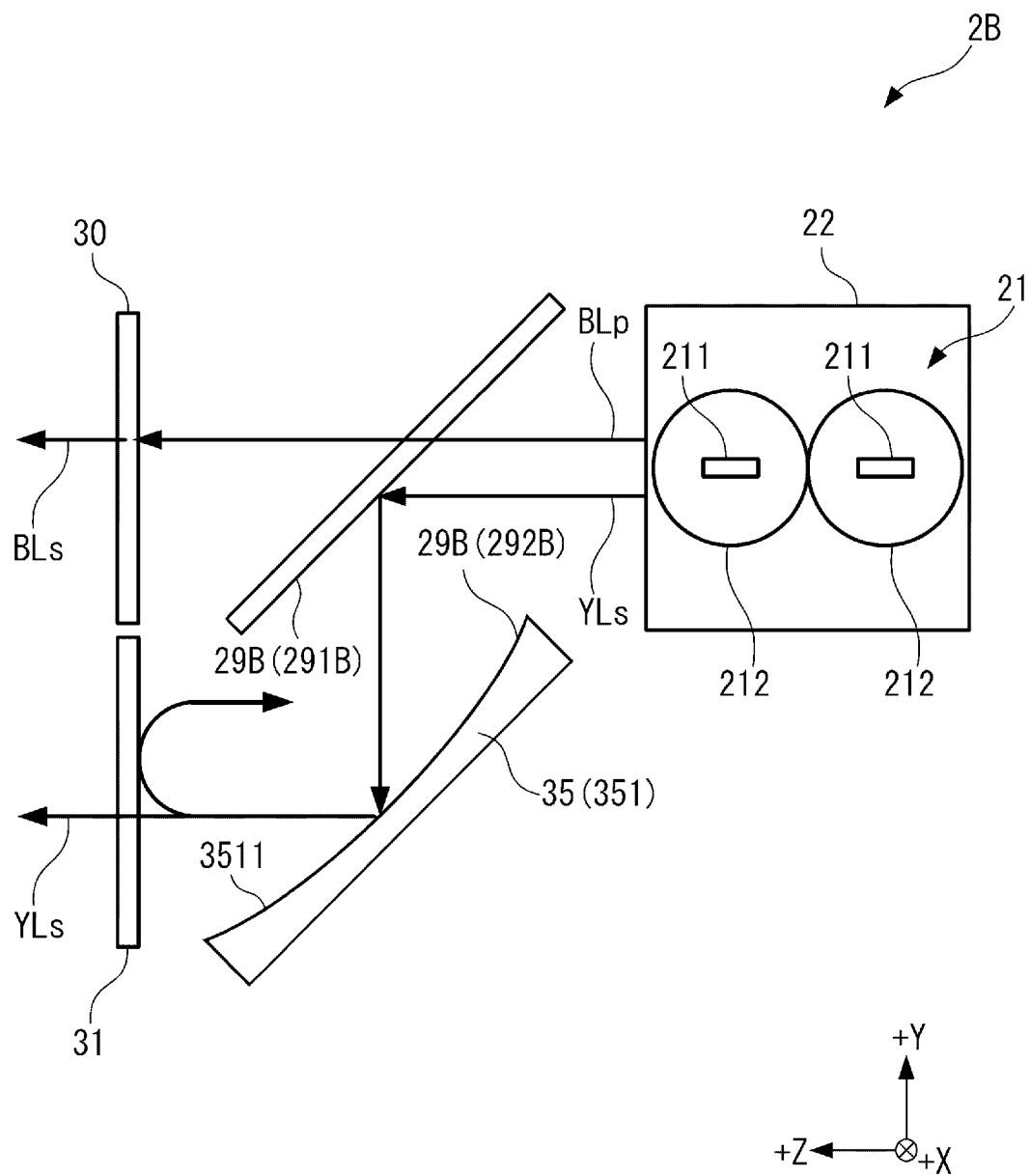
FIG. 11 is a schematic diagram of a light source device according to a first modified example of the first embodiment viewed from the −X direction.
Figure 12:
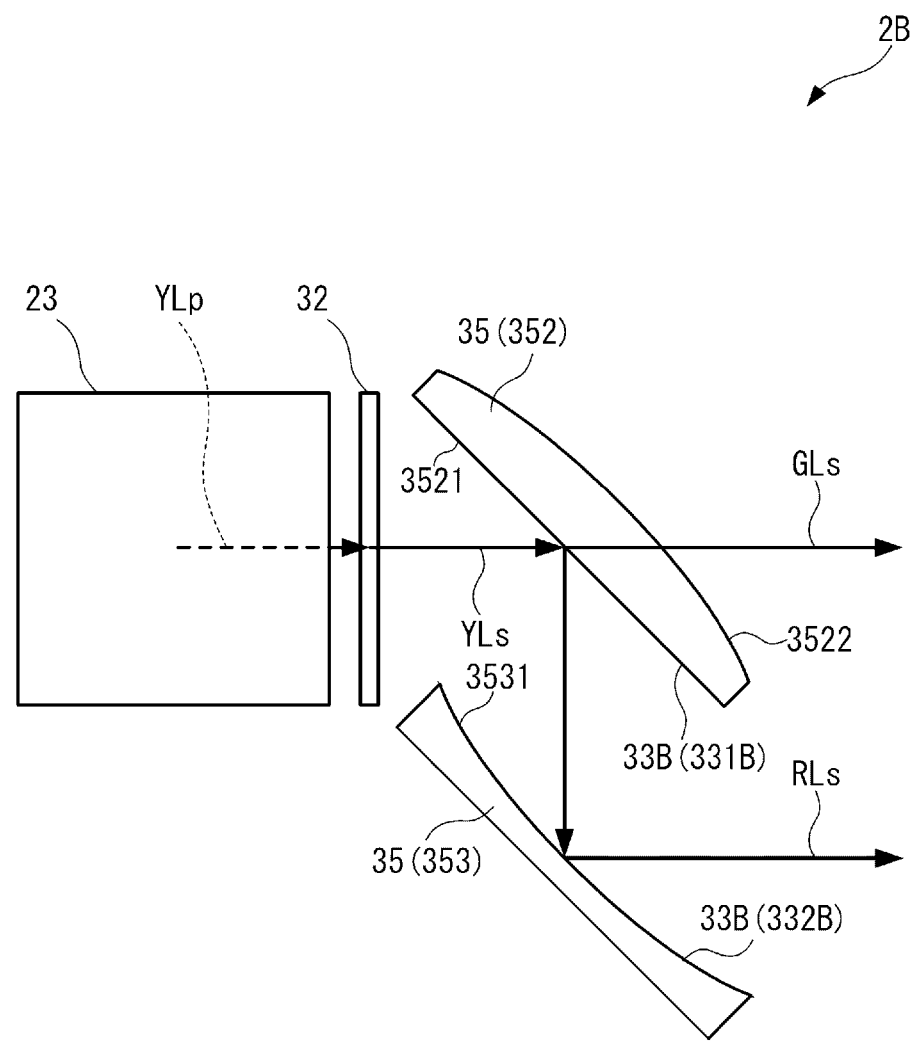
FIG. 12 is a schematic diagram of the light source device according to the first modified example of the first embodiment viewed from the +X direction.

FIG. 11 and FIG. 12 are schematic diagrams of an adjusting element 35 provided to a light source device 2B as a first modified example of the light source device 2A viewed from the −X direction and the +X direction, respectively. In other words, FIG. 11 is a schematic diagram of a first color separation element 29B, the second retardation element 30, the second reflecting element 31, and the adjusting element 35 provided to the light source device 2B viewed from the −X direction. Further, FIG. 12 is a schematic diagram of the third retardation element 32, a second color separation element 33B, and the adjusting element 35 provided to the light source device 2B viewed from the +X direction.

For example, as shown in FIG. 11 and FIG. 12, the light source device 2B as the first modified example of the light source device 2A has substantially the same configuration and function as those of the light source device 2A except the point that the first color separation element 29B, the second color separation element 33B, and the adjusting element 35 are provided instead of the first color separation element 29A, the second color separation element 33A, and the adjusting element 34. Further, in the light source device 2B, the reference wavelength range in the adjusting element 35 is set to a range within the wavelength region of the blue light beam. In other words, in the light source device 2B, the reference colored light beam is the blue light beam.

Similarly to the first color separation element 29A, the first color separation element 29B separates the blue light beam BLp and the yellow light beam YLs from the light entering the first color separation element 29B from the first polarization split element 22. As shown in FIG. 11, the first color separation element 29B has a first color separation layer 291B which transmits the blue light beam, and reflects a light beam longer in wavelength than the blue light beam, and a first reflecting layer 292B for reflecting the incident light.

The first color separation layer 291B transmits the blue light beam BLp entering the first color separation layer 291B from the first polarization split element 22 toward the +Z direction, and reflects the yellow light beam YLs entering the first color separation layer 291B from the first polarization split element 22 toward the −Y direction. The blue light beam BLp having been transmitted through the first color separation layer 291B enters the second retardation element 30.

It should be noted that in the light source device 2B, the first color separation layer 291B is provided to a light transmissive substrate shaped like a flat plate. In other words, the first color separation layer 291B can be formed of a dichroic mirror.

The first reflecting layer 292B reflects the yellow light beam YLs, which enters the first reflecting layer 292B in the −Y direction from the first color separation layer 291B, in parallel to the +Z direction as a proceeding direction of the blue light beam BLp transmitted through the first color separation layer 291B. In other words, the first reflecting layer 292B reflects the yellow light beam YLs, which enters the first reflecting layer 292B in the −Y direction, toward the +Z direction. The first reflecting layer 292B is provided to a plane of incidence of light 3511 of a first adjusting element 351.

Similarly to the second color separation element 33A, the second color separation element 33B separates the green light beam GLs and the red light beam RLs from the yellow light beam YLs entering the second color separation element 33B from the third retardation element 32. As shown in FIG. 12, the second color separation element 33B has a second color separation layer 331B which transmits the green light beam GLs toward the +Z direction, and reflects the red light beam RLs toward the −Y direction, and a second reflecting layer 332B for reflecting the red light beam RLs, which has been reflected toward the −Y direction by the second color separation layer 331B, toward the +Z direction.

The second color separation layer 331B is provided to a plane of incidence of light 3521 of a second adjusting element 352.

The second reflecting layer 332B is provided to a plane of incidence of light 3531 of a third adjusting element 353.

Similarly to the adjusting element 34, the adjusting element 35 is disposed in a light path of the target colored light beam which is a colored light beam having the peak wavelength out of the reference wavelength range, and is necessary to be adjusted in beam diameter out of the four light beams emitted from the light source device 2B. Further, when the target colored light beam is the colored light beam having the peak wavelength shorter than the lower limit value of the reference wavelength range, the adjusting element 35 disposed in the light path of the target colored light beam is the diameter expansion element for expanding the beam diameter of the target colored light beam, and when the target colored light beam is the colored light beam having the peak wavelength longer than the upper limit value of the reference wavelength range, the adjusting element 35 disposed in the light path of the target colored light beam is the diameter reduction element for reducing the beam diameter of the target colored light beam. It should be noted that as described above, in the adjusting element 35, the reference wavelength range is a range within the wavelength region of the blue light beam, and the reference colored light beam is the blue light beam.

Such an adjusting element 35 includes the first adjusting element 351 disposed in the light path of the yellow light beam YLs as the second colored light beam as shown in FIG. 11, and further includes the second adjusting element 352 disposed in the light path of the green light beam GLs as the third colored light beam, and the third adjusting element 353 disposed in the light path of the red light beam RLs as the fourth colored light beam as shown in FIG. 12.

As shown in FIG. 11, the first adjusting element 351 has the plane of incidence of light 3511 as a concavely curved surface facing to the +Y direction and the +Z direction. In the light source device 2B, the first reflecting layer 292B described above is provided to the plane of incidence of light 3511, and the first adjusting element 351 is configured as a concave mirror which is the diameter reduction element. In other words, the first reflecting layer 292B and the first adjusting element 351 are integrated with each other.

The first adjusting element 351 reduces the diameter of the yellow light beam YLs due to the shape of the plane of incidence of light 3511 when the yellow light beam YLs separated by the first color separation layer 291B is reflected by the first reflecting layer 292B. The yellow light beam YLs reflected by the first reflecting layer 292B enters the second reflecting element 31 described above.

As shown in FIG. 12, the second adjusting element 352 is a plano-convex lens having a plane of incidence of light 3521 as a flat surface facing to the −Y direction and the −Z direction, and a light exit surface 3522 as a convexly curved surface facing to the +Y direction and the +Z direction. In other words, the second adjusting element 352 is a diameter reduction element for reducing the beam diameter of the green light beam GLs entering the second adjusting element 352, and the green light beam GLs is reduced in diameter by passing through the second adjusting element 352. It should be noted that the green light beam GLs having passed through the second adjusting element 352 is emitted from the light source device 2B as the third colored light beam.

The third adjusting element 353 has a plane of incidence of light 3531 as a concavely curved surface facing to the +Y direction and the +Z direction. In the light source device 2B, the second reflecting layer 332B described above is provided to the plane of incidence of light 3531, and the third adjusting element 353 is configured as a concave mirror which is the diameter reduction element. In other words, the second reflecting layer 332B and the third adjusting element 353 are integrated with each other.

The third adjusting element 353 reduces the diameter of the red light beam RLs due to the shape of the plane of incidence of light 3531 when the red light beam RLs separated by the second color separation layer 331B is reflected by the second reflecting layer 332B. The red light beam RLs reflected by the second reflecting layer 332B is emitted from the light source device 2B as the fourth colored light beam.

According also to the projector 1 equipped with such a light source device 2B instead of the light source device 2A, substantially the same advantages as in the projector 1 equipped with the light source device 2A can be exerted.

Further, the second adjusting element 352 as the diameter reduction element is a convex lens. According to the above, it is possible to reduce the beam diameter of the green light beam GLs passing through the second adjusting element 352 with a simple configuration.

Second Modified Example of First Embodiment

Figure 13:
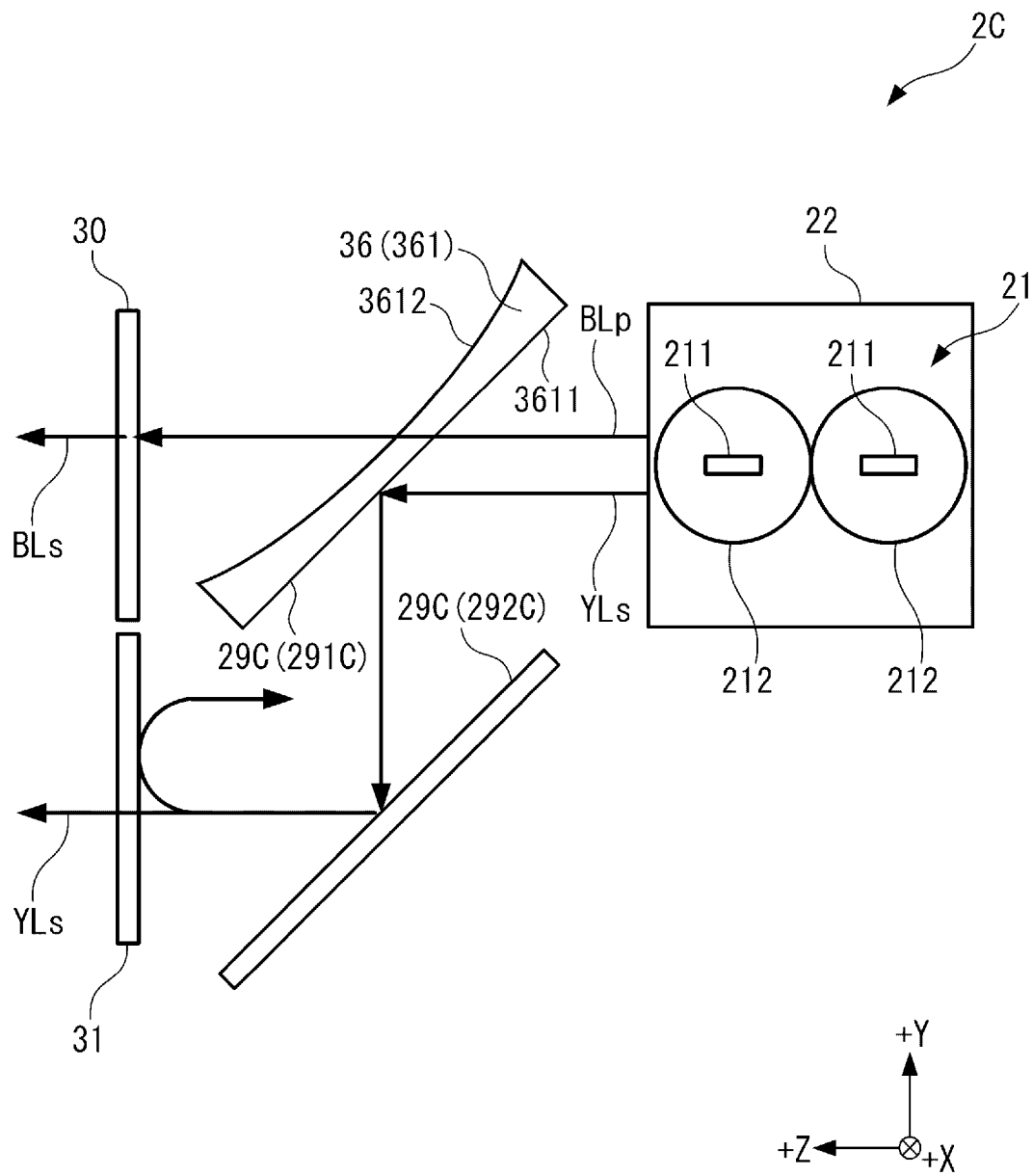
FIG. 13 is a schematic diagram of a light source device according to a second modified example of the first embodiment viewed from the −X direction.
Figure 14:
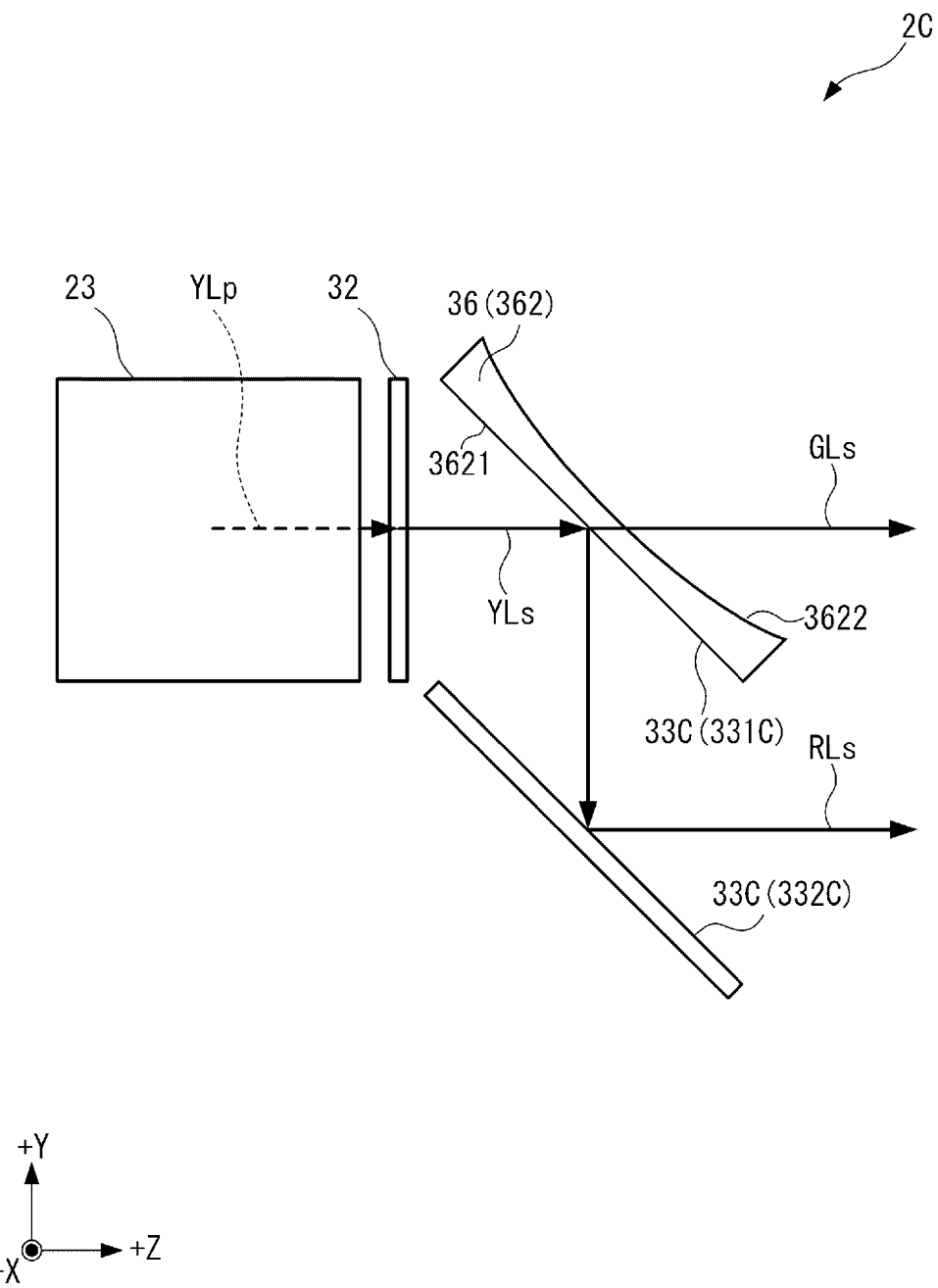
FIG. 14 is a schematic diagram of the light source device according to the second modified example of the first embodiment viewed from the +X direction.

FIG. 13 and FIG. 14 are schematic diagrams of an adjusting element 36 provided to a light source device 2C as a second modified example of the light source device 2A viewed from the −X direction and the +X direction, respectively. In other words, FIG. 13 is a schematic diagram of a first color separation element 29C, the second retardation element 30, the second reflecting element 31, and the adjusting element 36 provided to the light source device 2C viewed from the −X direction. Further, FIG. 14 is a schematic diagram of the third retardation element 32, a second color separation element 33C, and the adjusting element 36 provided to the light source device 2C viewed from the +X direction.

For example, as shown in FIG. 13 and FIG. 14, the light source device 2C as the second modified example of the light source device 2A has substantially the same configuration and function as those of the light source device 2A except the point that the first color separation element 29C, the second color separation element 33C, and the adjusting element 36 are provided instead of the first color separation element 29A, the second color separation element 33A, and the adjusting element 34. Further, in the light source device 2C, the reference wavelength range in the adjusting element 36 is set to a range within the wavelength region of the red light beam. In other words, in the light source device 2C, the reference colored light beam is the red light beam.

Similarly to the first color separation element 29A, the first color separation element 29C separates the blue light beam BLp and the yellow light beam YLs from the light entering the first color separation element 29C from the first polarization split element 22. As shown in FIG. 13, the first color separation element 29C has a first color separation layer 291C which transmits the blue light beam, and reflects a light beam longer in wavelength than the blue light beam, and a first reflecting layer 292C for reflecting the incident light.

The first color separation layer 291C transmits the blue light beam BLp entering the first color separation layer 291C from the first polarization split element 22 toward the +Z direction, and reflects the yellow light beam YLs entering the first color separation layer 291C from the first polarization split element 22 toward the −Y direction. The blue light beam BLp having been transmitted through the first color separation layer 291C enters the second retardation element 30.

It should be noted that in the light source device 2C, the first color separation layer 291C is provided to a plane of incidence of light 3611 of a first adjusting element 361.

The first reflecting layer 292C reflects the yellow light beam YLs, which enters the first reflecting layer 292C in the −Y direction from the first color separation layer 291C, in parallel to the +Z direction as a proceeding direction of the blue light beam BLp transmitted through the first color separation layer 291C. In other words, the first reflecting layer 292C reflects the yellow light beam YLs, which enters the first reflecting layer 292C in the −Y direction, toward the +Z direction. The yellow light beam YLs reflected by the first reflecting layer 292C enters the second reflecting element 31. The first reflecting layer 292C is provided to a substrate shaped like a flat plate.

Similarly to the second color separation element 33A, the second color separation element 33C separates the green light beam GLs and the red light beam RLs from the yellow light beam YLs entering the second color separation element 33C from the third retardation element 32. As shown in FIG. 14, the second color separation element 33C has a second color separation layer 331C which transmits the green light beam GLs toward the +Z direction, and reflects the red light beam RLs toward the −Y direction, and a second reflecting layer 332C for reflecting the red light beam RLs, which has been reflected toward the −Y direction by the second color separation layer 331C, toward the +Z direction.

The second color separation layer 331C is provided to a plane of incidence of light 3621 of a second adjusting element 362.

The second reflecting layer 332C is provided to a substrate shaped like a flat plate. The red light beam RLs reflected by the second reflecting layer 332C is emitted from the light source device 2C as the fourth colored light beam.

Similarly to the adjusting element 34, the adjusting element 36 is disposed in a light path of the target colored light beam which is a colored light beam having the peak wavelength out of the reference wavelength range, and is necessary to be adjusted in beam diameter out of the four light beams emitted from the light source device 2C. Further, when the target colored light beam is the colored light beam having the peak wavelength shorter than the lower limit value of the reference wavelength range, the adjusting element 36 disposed in the light path of the target colored light beam is the diameter expansion element for expanding the beam diameter of the target colored light beam, and when the target colored light beam is the colored light beam having the peak wavelength longer than the upper limit value of the reference wavelength range, the adjusting element 36 disposed in the light path of the target colored light beam is the diameter reduction element for reducing the beam diameter of the target colored light beam.

Such an adjusting element 36 includes the first adjusting element 361 disposed in the light path of the blue light beam BLp as the first colored light beam as shown in FIG. 13, and further includes the second adjusting element 362 disposed in the light path of the green light beam GLs as the third colored light beam as shown in FIG. 14.

It should be noted that as described above, in the light source device 2C, the reference wavelength range is the range within the wavelength region of the red light beam the longest in wavelength out of the four light beams to be emitted from the light source device 2C, and the red light beam is defined as the reference colored light beam. According to the above, since there is no need to adjust the beam diameter of the yellow light beam YLs including the red light component, the adjusting element 36 is not disposed in the light path of the yellow light beam YLs emitted as the second colored light beam.

As shown in FIG. 13, the first adjusting element 361 is a plano-concave lens having the plane of incidence of light 3611 as a flat surface facing to the −Y direction and the −Z direction, and a light exit surface 3612 as a concavely curved surface facing to the +Y direction and the +Z direction. In other words, the first adjusting element 361 is the diameter expansion element for expanding the beam diameter of the blue light beam BLp entering the first adjusting element 361. In the light source device 2C, the first color separation layer 291C described above is provided to the plane of incidence of light 3611, and the first color separation layer 291C and the first adjusting element 361 are integrated with each other.

The blue light beam BLp having been transmitted through the first color separation layer 291C is expanded in diameter by passing through the first adjusting element 361. The blue light beam BLp having passed through the first adjusting element 361 enters the second retardation element 30.

As shown in FIG. 14, the second adjusting element 362 is a plano-concave lens having the plane of incidence of light 3621 as a flat surface facing to the −Y direction and the −Z direction, and a light exit surface 3622 as a concavely curved surface facing to the +Y direction and the +Z direction. In other words, the second adjusting element 362 is the diameter expansion element for expanding the beam diameter of the green light beam GLs entering the second adjusting element 362. In the light source device 2C, the second color separation layer 331C described above is provided to the plane of incidence of light 3621, and the second color separation layer 331C and the second adjusting element 362 are integrated with each other.

The green light beam GLs having been transmitted through the second color separation layer 331C is expanded in diameter by passing through the second adjusting element 362. The green light beam GLs having passed through the second adjusting element 362 is emitted from the light source device 2C as the third colored light beam.

According also to the projector 1 equipped with such a light source device 2C instead of the light source device 2A, substantially the same advantages as in the projector 1 equipped with the light source device 2A can be exerted.

Further, the first adjusting element 361 and the second adjusting element 362 as the diameter expansion elements are each a concave lens. According to the above, it is possible to expand the beam diameters of the blue light beam BLp passing through the first adjusting element 361 and the green light beam GLs passing through the second adjusting element 362 with a simple configuration.

Third Modified Example of First Embodiment

In the light source devices 2A through 2C described above, it is assumed that the blue light beam BLs as the first colored light beam is emitted from the first exit position S1, the yellow light beam YLs as the second colored light beam is emitted form the second exit position S2, the green light beam GLs as the third colored light beam is emitted from the third exit position S3, and the red light beam RLs as the fourth colored light beam is emitted from the fourth exit position S4. However, this is not a limitation. For example, it is possible to configure the light source devices 2A through 2C so that the blue light beam BLs is emitted from the second exit position S2, and the yellow light beam YLs is emitted from the first exit position S1. Further, for example, it is possible to configure the light source devices 2A through 2C so that the green light beam GLs is emitted from the fourth exit position S4, and the red light beam RLs is emitted from the third exit position S3.

In other words, it is possible to configure the light source devices 2A through 2C so that one of the blue light beam BLs and the yellow light beam YLs is emitted from the first exit position S1, and the other thereof is emitted from the second exit position S2, and further, one of the green light beam GLs and the red light beam RLs is emitted from the third exit position S3, and the other thereof is emitted from the fourth exit position S4. In this case, defining the blue light beam BLs, the yellow light beam YLs, the green light beam GLs, and the red light beam RLs except the reference colored light beam as the target colored light beams, it is sufficient to dispose the diameter expansion element as the adjusting element in the light path of the target colored light beam when the target colored light beam has the peak wavelength shorter than the lower limit value of the reference wavelength range, and to dispose the diameter reduction element as the adjusting element in the light path of the target colored light beam when the target colored light beam has the peak wavelength longer than the upper limit value of the reference wavelength range. It should be noted that since the yellow light beam YLs is the light beam including the green light beam GLs and the red light beam RLs, when the reference colored light beam is the blue light beam or the green light beam, it is sufficient to dispose the diameter reduction element in the light path of the yellow light beam YLs, and when the reference colored light beam is the red light beam, there is no need to dispose the adjusting element in the light path of the yellow light beam YLs.

Second Embodiment

Then, a second embodiment of the present disclosure will be described.

A projector according to the second embodiment is provided with substantially the same configuration as that of the projector 1 according to the first embodiment, but is different in the point that the green light beam or the red light beam is emitted instead of the yellow light beam. It should be noted that in the following description, a part which is the same or substantially the same as the part having already been described is denoted by the same reference symbol, and the description thereof will be omitted.

Figure 15:
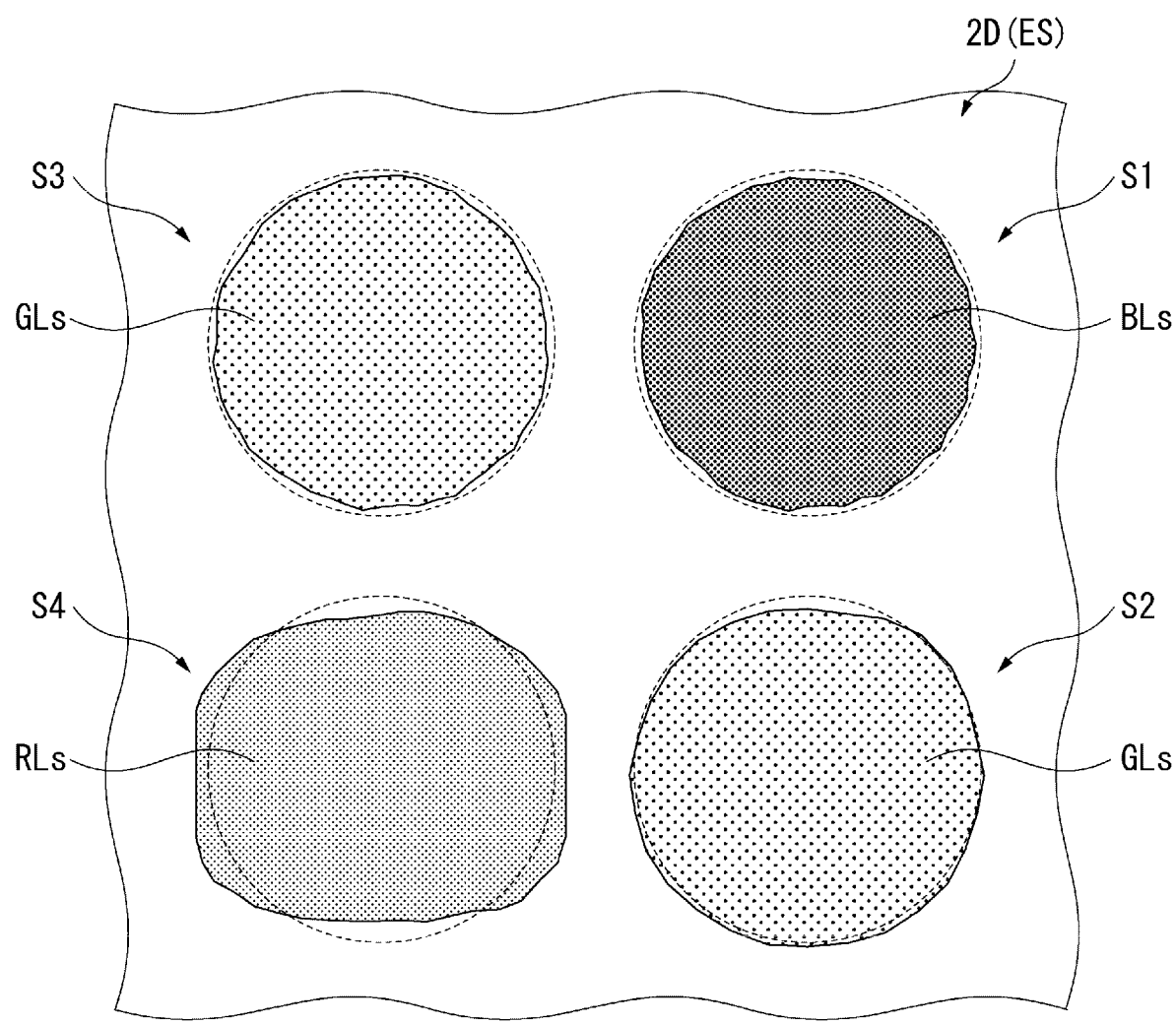
FIG. 15 is a schematic diagram showing exit positions of light beams emitted from a light source device according to a second embodiment.

FIG. 15 is a schematic diagram showing the exit positions S1 through S4 of the light beam emitted from a light source device 2D according to the present embodiment. It should be noted that FIG. 15 is a diagram of the exit surface ES of the light source device 2D viewed from the +Z direction as the light exit side.

The projector according to the present embodiment has substantially the same configuration and function as those of the projector 1 described above except the point that the light source device 2D shown in FIG. 15 is provided instead of the light source device 2A.

The light source device 2D emits the light for illuminating the light modulation device 6 in the +Z direction. The light emitted by the light source device 2D is the linearly polarized light with the uniform polarization direction, and corresponds to the blue light beam BLs as the first colored light beam, the green light beam GLs as the second colored light beam, the green light beam GLs as the third colored light beam, and the red light beam RLs as the fourth colored light beam spatially separated from each other.

Similarly to the light source device 2A, the light source device 2D has the exit positions S1 through S4 for emitting the respective light beams in the exit surface ES.

The first exit position S1 is located at the −X direction side and on the +Y direction side in the exit surface ES, and the blue light beam BLs as the first colored light beam is emitted therefrom.

From the second exit position S2 located at the −Y direction side as the second direction side of the first exit position S1, the green light beam GLs as the second colored light beam is emitted.

From the third exit position S3 located at the +X direction side as the third direction side of the first exit position S1, the green light beam GLs as the third colored light beam is emitted.

From the fourth exit position S4 located at the −Y direction side as the second direction side of the third exit position S3, the red light beam RLs as the fourth colored light beam is emitted.

Figure 16:
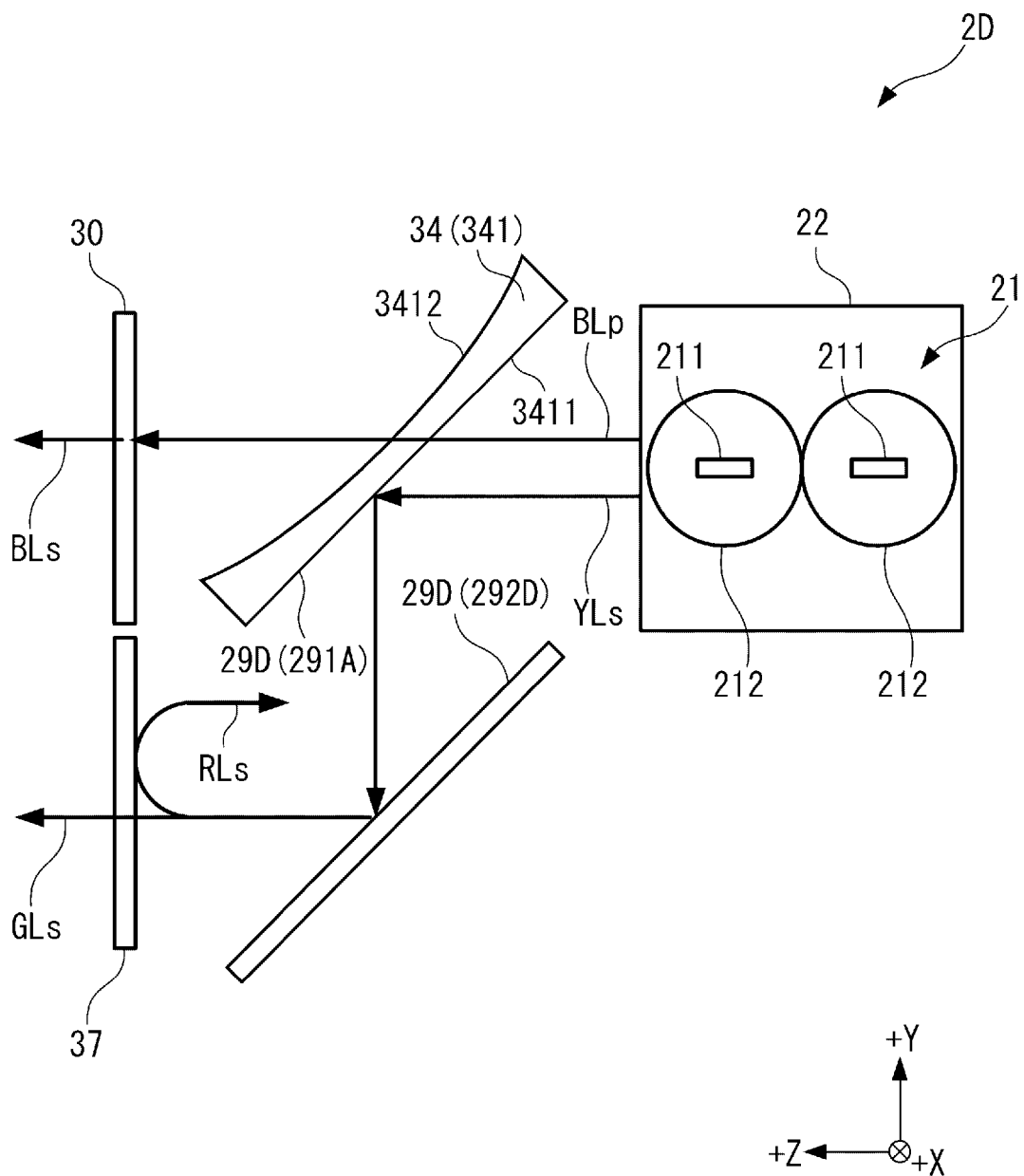
FIG. 16 is a schematic diagram of the light source device according to the second embodiment viewed from the −X direction.

FIG. 16 is a schematic diagram of the light source device 2D viewed from the −X direction, and is a schematic diagram of a first color separation element 29D, the second retardation element 30, the adjusting element 34, and a third color separation element 37 provided to the light source device 2D viewed from the −X direction.

As shown in FIG. 16, the light source device 2D has substantially the same configuration and function as those of the light source device 2A except the point that the first color separation element 29D and the third color separation element 37 are provided instead of the first color separation element 29A and the second reflecting element 31, and the second adjusting element 342 is not provided. It should be noted that similarly to the case of the light source device 2A, in the light source device 2D, the reference wavelength range is included in the wavelength region of the green light beam, and the reference colored light beam is the green light beam.

Similarly to the first color separation element 29A, the first color separation element 29D separates the blue light beam BLp and the yellow light beam YLs from the blue light beam BLp and the yellow light beam YLs entering the first color separation element 29D. The first color separation element 29D has the first color separation layer 291A which transmits the blue light beam BLp entering the first color separation layer 291D toward the +Z direction, and reflects the yellow light beam YLs entering the first color separation layer 291D toward the −Y direction, and a first reflecting layer 292D for reflecting the yellow light beam YLs reflected by the first color separation layer 291A toward the +Z direction.

As described above, the first color separation layer 291A is provided to the plane of incidence of light 3411 as the flat surface in the first adjusting element 341 as the concave lens.

The first reflecting layer 292D is provided to a substrate shaped like a flat plate. The yellow light beam YLs reflected by the first reflecting layer 292D enters the third color separation element 37.

The third color separation element 37 is disposed at substantially the same arrangement position as that of the second reflecting element 31. In other words, the third color separation element 37 is disposed in the light path of the yellow light beam YLs reflected by the first reflecting layer 292D. The third color separation element 37 has a property of transmitting the green light beam and reflecting the red light beam. In other words, the third color separation element 37 is a blocking element for transmitting the green light beam and blocking the red light beam.

Therefore, the green light beam GLs included in the yellow light beam YLs entering the third color separation element 37 is transmitted through the third color separation element 37, and is then emitted from the light source device 2D as the second colored light beam.

In contrast, the red light beam RLs included in the yellow light beam YLs entering the third color separation element 37 is reflected by the third color separation element 37. The red light beam RLs thus reflected enters the wavelength conversion element 28 via the first color separation element 29D, the first polarization split element 22, the second polarization split element 23, and the second light collection element 27 similarly to the yellow light beam YLs reflected by the second reflecting element 31.

As described above, since the yellow phosphor included in the wavelength conversion element 28 hardly absorbs the yellow light beam having entered the wavelength conversion element 28 from the outside, the yellow phosphor does not absorb the red light beam RLs. Therefore, the red light beam RLs having entered the wavelength conversion element 28 is repeatedly reflected inside the wavelength conversion element 28 to thereby turn to a red light beam as unpolarized light, and is then emitted to the outside of the wavelength conversion element 28 together with the yellow light beam YLn generated in the yellow phosphor.

Out of the red light beam emitted from the wavelength conversion element 28, the red light beam RLs as the s-polarized light is reflected by the third color separation element 37, and then returns to the wavelength conversion element 28. In contrast, the red light beam as the p-polarized light out of the red light beam emitted from the wavelength conversion element 28 passes through the second polarization split element 23 toward the +Z direction, and is converted by the third retardation element 32 into the red light beam RLs, and is by extension emitted from the light source device 2D as the fourth colored light beam.

As described above, the second colored light beam which is transmitted through the third color separation element 37, and is then emitted from the light source device 2D is the green light beam GLs. Further, since the green light beam GLs is collimated by the second light collection element 27, the beam diameter of the green light beam GLs as the second colored light beam substantially coincides with the beam diameter of the green light beam GLs as the third colored light beam. In the light source device 2D in which the green light beam is defined as the reference colored light beam, there is no need to adjust the beam diameter of the green light beam GLs passing through the third color separation element 37. Therefore, in the light source device 2D, the second adjusting element 342 is not disposed in the light path of the yellow light beam YLs separated by the first color separation element 29D.

It should be noted that when the reference wavelength range is not included in the wavelength region of the green light beam, and the reference colored light beam is not the green light beam, it is preferable for the first reflecting layer 292D to be provided to a plane of incidence of light of an adjusting element for adjusting the beam diameter of the yellow light beam YLs entering the adjusting element.

Advantages of Second Embodiment

According to the projector related to the present embodiment described hereinabove, in addition to the advantages substantially the same as those of the projector 1 according to the first embodiment, the following advantages can be obtained.

The light source device 2D emits the green light beam GLs as the second colored light beam. In the light path of the yellow light beam YLs separated by the first color separation element 29D, there is disposed the third color separation element 37 as the blocking element for transmitting the green light beam GLs and blocking the red light beam RLs by reflecting the red light beam RLs as another colored light beam.

According to the above, it is possible for the light source device 2D to emit the green light beam GLs as the second colored light beam in addition to the green light beam GLs as the third colored light beam, and further, it is possible to increase the light intensity of the red light beam emitted as the fourth colored light beam. Therefore, it is possible to improve the chromatic purity of the image to be formed by the light modulation device 6 for modulating the light emitted from the light source device 2D and then projected by the projection optical device 7.

Further, the arrangement of the colored light beams emitted from the light source device 2D can preferably be adopted in the projector having a pixel shift mechanism which is disposed between the light modulation device 6 and the projection optical device 7, and performs pixel shift for shifting a projection position on the projection target surface of the image light emitted from the light modulation device 6.

First Modified Example of Second Embodiment

In the light source device 2D, the reference wavelength range is set to a range included in the wavelength region of the green light beam, and the reference colored light beam is set to the green light beam. However, this is not a limitation, and it is possible for the reference wavelength range to be included in, for example, the wavelength region of the blue light beam, or the wavelength region of the red light beam. In other words, the reference colored light beam can be the blue light beam, or can also be the red light beam.

In this case, as in the first modified example and the second modified example of the first embodiment described above, it is sufficient to dispose the adjusting element as the diameter reduction element in the light path of the target colored light beam having the peak wavelength shorter than the lower limit value in the reference wavelength range out of the colored light beams separated by the first color separation element 29D and the second color separation element 33A, and it is sufficient to dispose the adjusting element as the diameter expansion element in the light path of the target colored light beam having the peak wavelength longer than the upper limit value in the reference wavelength range.

Second Modified Example of Second Embodiment

In the light source device 2D, the third color separation element 37 is assumed to have the property of transmitting the green light beam GLs and reflecting the red light beam RLs. However, this is not a limitation, and it is possible for the third color separation element 37 to have a property of blocking the green light beam GLs by reflection or the like while transmitting the red light beam RLs.

Here, depending on the yellow phosphor included in the wavelength conversion element 28, the red light beam included in the yellow light beam emitted from the wavelength conversion element 28 becomes insufficient in some cases.

In contrast, when the third color separation element 37 reflects the green light beam GLs and transmits the red light beam RLs, it is possible to further increase the light intensity of the red light beam RLs emitted from the light source device 2D. Further, since it is possible to make the red light beam enter the second sub-pixels SX2 and the fourth sub-pixels SX4 out of the sub-pixels SX1 through SX4 provided to the pixels PX of the liquid crystal panel 61, in this case, it is possible to improve the chromatic purity of the image to be projected.

Third Modified Example of Second Embodiment

It is assumed that the light source device 2D emits the blue light beam BLs as the first colored light beam from the first exit position S1, emits the green light beam GLs as the second colored light beam from the second exit position S2, emits the green light beam GLs as the third colored light beam from the third exit position S3, and emits the red light beam RLs as the fourth colored light beam from the fourth exit position S4. However, this is not a limitation.

In other words, it is possible to configure the light source devices 2D so that one of the blue light beam BLs and the green light beam GLs is emitted from the first exit position S1, and the other thereof is emitted from the second exit position S2, and further, one of the green light beam GLs and the red light beam RLs is emitted from the third exit position S3, and the other thereof is emitted from the fourth exit position S4. In this case, it is sufficient to dispose the adjusting element in the light path of the target colored light beam having the peak wavelength out of the reference wavelength range out of the blue light beam BLs, the yellow light beam YLs, the green light beam GLs, and the red light beam RLs. On this occasion, it is sufficient to dispose the adjusting element as the diameter expansion element in the light path of the target colored light beam having the peak wavelength shorter than the lower limit value in the reference wavelength range, and it is sufficient to dispose the adjusting element as the diameter reduction element in the light path of the target colored light beam having the peak wavelength longer than the upper limit value in the reference wavelength range. It should be noted that since the yellow light beam YLs includes the green light beam GLs and the red light beam RLs longer in peak wavelength than the green light GLs, it is preferable to define the peak wavelength as the peak wavelength included in the wavelength region of the red light beam RLs.

Figure 17:
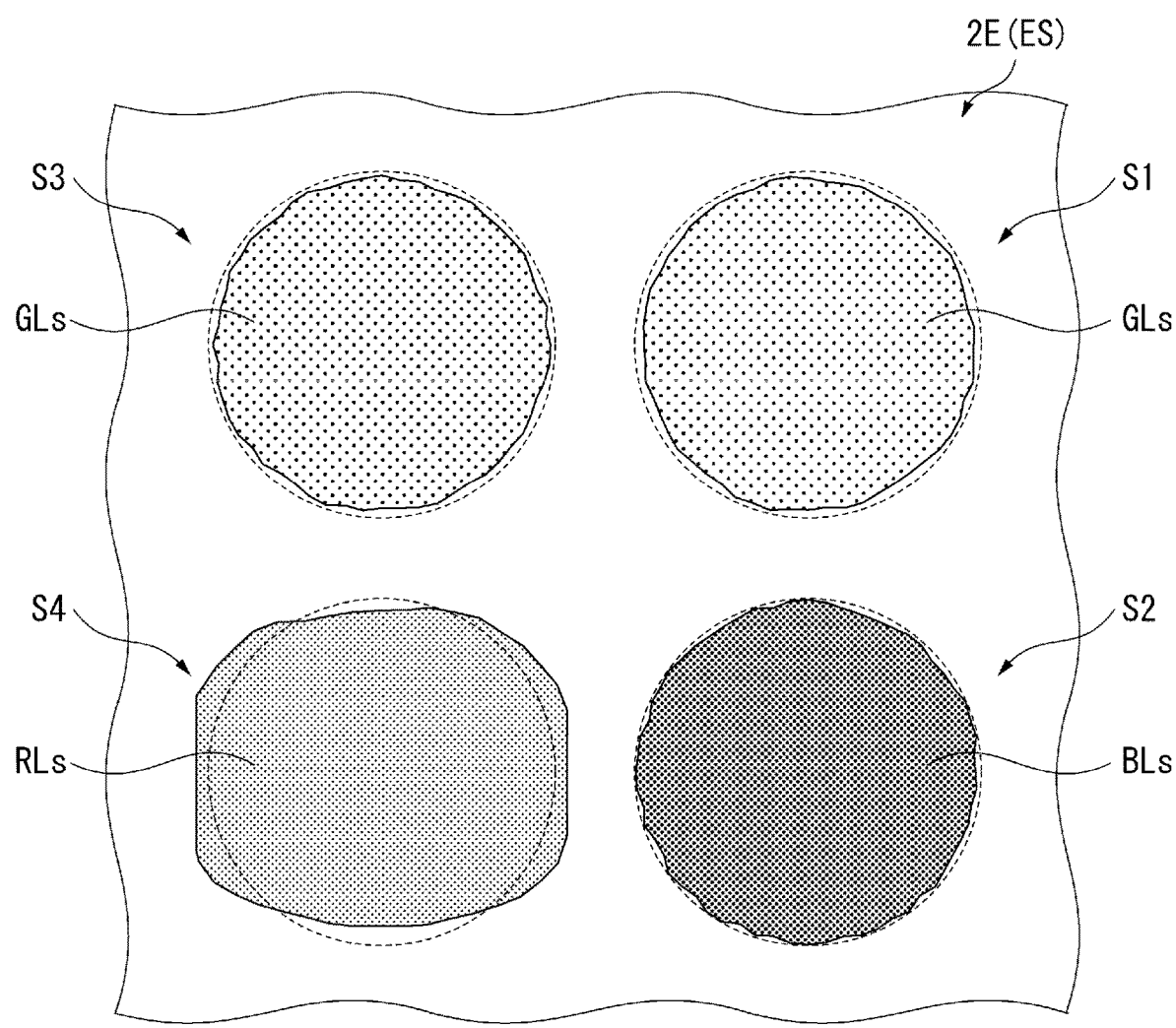
FIG. 17 is a schematic diagram showing exit positions of respective colored light beams in a light source device according to a second modified example of the second embodiment.

FIG. 17 is a schematic diagram of the exit positions of the respective colored light beams in a light source device 2E as a third modified example of the light source device 2D viewed from the +Z direction as the light exit side.

For example, the light source device 2E as the third modified example of the light source device 2D emits the light for illuminating the light modulation device 6 in the +Z direction. Similarly to the light source device 2D, the light emitted by the light source device 2E is the linearly polarized light with the uniform polarization direction, and as shown in FIG. 17, corresponds to the green light beam GLs as the first colored light beam, the blue light beam BLs as the second colored light beam, the green light beam GLs as the third colored light beam, and the red light beam RLs as the fourth colored light beam spatially separated from each other. It should be noted that in the light source device 2E, the reference wavelength range is a range included in the wavelength region of the green light beam, and the reference colored light beam is the green light beam.

Similarly to the light source devices 2A through 2D, the light source device 2E has the exit positions S1 through S4 for emitting the respective light beams in the exit surface ES.

The first exit position S1 is located at the −X direction side and on the +Y direction side in the exit surface ES, and the green light beam GLs as the first colored light beam is emitted therefrom.

From the second exit position S2 located at the −Y direction side as the second direction side of the first exit position S1, the blue light beam BLs as the second colored light beam is emitted.

From the third exit position S3 located at the +X direction side as the third direction side of the first exit position S1, the green light beam GLs as the third colored light beam is emitted.

From the fourth exit position S4 located at the −Y direction side as the second direction side of the third exit position S3, the red light beam RLs as the fourth colored light beam is emitted.

Figure 18:
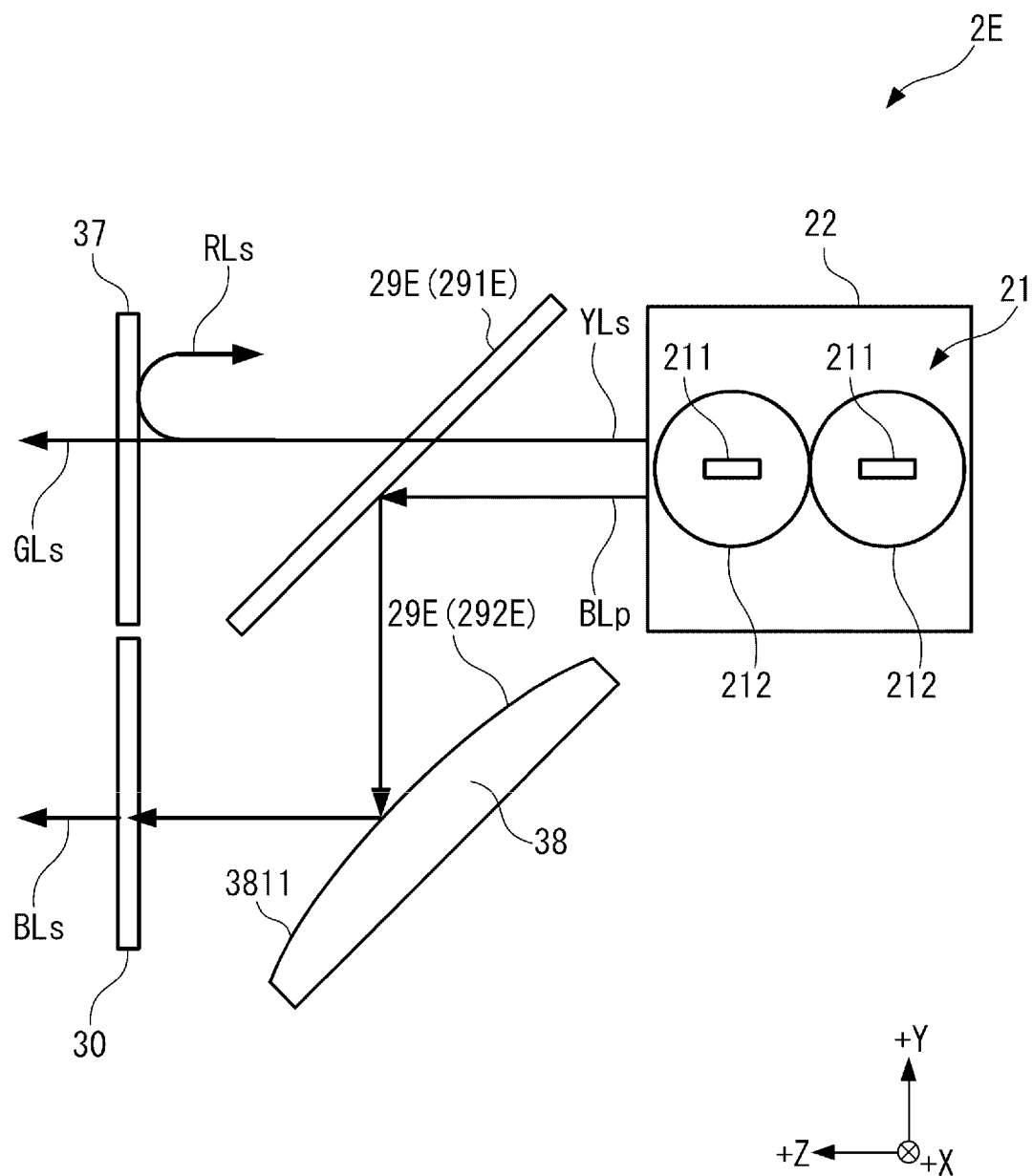
FIG. 18 is a schematic diagram of the light source device according to the second modified example of the second embodiment viewed from the −X direction.

FIG. 18 is a schematic diagram of the light source device 2E viewed from the −X direction, and is a schematic diagram of a first color separation element 29E, the second retardation element 30, an adjusting element 38, and the third color separation element 37 provided to the light source device 2E viewed from the −X direction.

As shown in FIG. 18, the light source device 2E has substantially the same configuration and function as those of the light source device 2D except the point that the first color separation element 29E is provided instead of the first color separation element 29D, and the adjusting element 38 is further provided. Specifically, in the light source device 2E, the configuration of emitting the green light beam GLs as the third colored light beam, and the configuration of emitting the red light beam RLs as the fourth colored light beam are the same as in the light source device 2D.

Similarly to the first color separation element 29D, the first color separation element 29E separates the blue light beam BLp and the yellow light beam YLs from the blue light beam BLp and the yellow light beam YLs entering the first color separation element 29E from the first polarization split element 22. The first color separation element 29E has a first color separation layer 291E which transmits the yellow light beam YLs in the +Z direction, and reflects the blue light beam BLp toward the −Y direction, and a first reflecting layer 292E for reflecting the blue light beam BLp entering the first reflecting layer 292E in the −Y direction from the first color separation layer 291E toward the +Z direction parallel to the yellow light beam YLs transmitted through the first color separation layer 291E.

The first color separation layer 291E is provided to a substrate shaped like a flat plate. The yellow light beam YLs transmitted through the first color separation layer 291E enters the third color separation element 37. The green light beam GLs included in the yellow light beam YLs entering the third color separation element 37 is transmitted through the third color separation element 37, and is then emitted from the light source device 2E as the first colored light beam. In contrast, the red light beam RLs included in the yellow light beam YLs having entered the third color separation element 37 is reflected by the third color separation element 37.

The first reflecting layer 292E is provided to a plane of incidence of light 3811 of the adjusting element 38.

The adjusting element 38 is disposed in the light path of the blue light beam BLp separated by the first color separation layer 291E. The adjusting element 38 has the plane of incidence of light 3811 as a convexly curved surface facing to the +Y direction and the +Z direction. In the light source device 2E, the first reflecting layer 292E described above is provided to the plane of incidence of light 3811, and the adjusting element 38 is configured as a convex mirror which is the diameter expansion element. In other words, the first reflecting layer 292E and the adjusting element 38 are integrated with each other.

The adjusting element 38 expands the diameter of the blue light beam BLp due to the shape of the plane of incidence of light 3811 when the blue light beam BLp separated by the first color separation layer 291E is reflected by the first reflecting layer 292E. The blue light beam BLp thus expanded in beam diameter by the adjusting element 38 is converted by the second retardation element 30 into the blue light beam BLs, and the blue light beam BLs is emitted from the light source device 2E as the second colored light beam.

According also to the projector equipped with such a light source device 2E instead of the light source device 2D, substantially the same advantages as in the projector equipped with the light source device 2D can be exerted.

Modifications of Embodiments

The present disclosure is not limited to each of the embodiments described above, but includes modifications, improvements, and so on within the range in which the advantages of the present disclosure can be achieved.

In the first embodiment, it is assumed that the light source devices 2A through 2C each emit the blue light beam BLs, the yellow light beam YLs, the green light beam GLs, and the red light beam RLs which are the s-polarized light and are spatially separated from each other. In the second embodiment, it is assumed that the light source devices 2D, 2E each emit the blue light beam BLs, the green light beam GLs, and the red light beam RLs which are the s-polarized light and are spatially separated from each other. However, this is not a limitation, and the polarization state of the colored light beams emitted by the light source device can be another polarization state. For example, it is possible for the light source device to be provided with a configuration of emitting the first through fourth colored light beams as p-polarized light spatially separated from each other.

Further, the polarization directions of the colored light beams emitted from the light source device are not required to be the same as each other, and at least one of the colored light beams to be emitted from the light source device can be different polarized light from the rest of the colored light beams.

In each of the embodiment described above, it is assumed that the reference wavelength range is included in the wavelength region of any one of the first through fourth colored light beams emitted by the light source device, and the reference colored light beam is any one of the first through fourth colored light beams. However, this is not a limitation, and it is possible to set the reference wavelength range and the reference colored light beam based on a different colored light beam from the colored light beams emitted by the light source device.

In each of the embodiments described above, it is assumed that the target colored light beams to be adjusted in beam diameter by the adjusting element are two or three of the four colored light beams to be emitted from the light source device. However, this is not a limitation, and it is possible to define just one of the four colored light beams to be emitted from the light source device as the target colored light beam. In other words, the colored light beam to be adjusted in beam diameter by the adjusting element disposed on the light path of that colored light beam can be just one of the four colored light beams to be emitted from the light source device.

In each of the embodiments described above, it is assumed that the diameter expansion element as the adjusting element is the concave lens or the convex mirror, and the diameter reduction element as the adjusting element is the convex lens or the concave mirror. However, this is not a limitation, but other configurations can be adopted providing the beam diameter of the incident light beam can be adjusted.

In the first embodiment described above, it is assumed that the colored light beams emitted from the light source devices 2A through 2C are the blue light beam, the yellow light beam, the green light beam, and the red light beam. In the second embodiment described above, it is assumed that the colored light beams emitted from the light source devices 2D, 2E are the blue light beam, the green light beam, and the red light beam. However, the colored light beams emitted by the light source device are not limited to the blue light beam, the yellow light beam, the green light beam, and the red light beam, but can also be other colored light beams.

In the first embodiment described above, it is assumed that one of the first colored light beam and the second colored light beam is the blue light beam, and the other thereof is either one of the green light beam and the yellow light beam. Further, it is assumed that one of the third colored light beam and the fourth colored light beam is the green light beam, and the other thereof is the red light beam. However, this is not a limitation, and the colored light beams to be emitted as the first through fourth colored light beams can arbitrarily be changed in accordance with the configuration of the light source device. Further, the reference wavelength range and the reference colored light beam can arbitrarily be changed, and based on the change, the positions of the adjusting elements can arbitrarily be changed.

In each of the embodiments described above, it is assumed that the first color separation element and the adjusting element are integrated with each other, and the second color separation element and the adjusting element are integrated with each other. For example, it is assumed that the first color separation layer 291A and the first adjusting element 341 are integrated with each other, and the first reflecting layer 292A and the second adjusting element 342 are integrated with each other. Further, for example, it is assumed that the second reflecting layer 332A and the third adjusting element 343 are integrated with each other, and the second color separation layer 331A and the second adjusting element 352 are integrated with each other. However, this is not a limitation, and the first color separation layer and the first reflecting layer of the first color separation element, and the adjusting element can be disposed separately from each other, and the second color separation layer and the second reflecting layer of the second color separation element, and the adjusting element can be disposed separately from each other.

Further, the first color separation element is not limited to the configuration having the first color separation layer and the first reflecting layer, but another configuration can also be adopted. The same applies to the second color separation element.

In each of the embodiments described above, the configurations of the light source devices 2A through 2E are referred to in the drawings described above, but the configuration of the light source device to which the present disclosure can be applied is not limited to the above. In other words, the present disclosure can be applied to any light source devices for emitting the first through fourth colored light beams spatially separated from each other.

For example, it is assumed that the light source section 21 emits the blue light beams BLs, BLp in the +X direction. However, this is not a limitation, and it is also possible that the light sources 211 emit the blue light beams BLs, BLp in a direction crossing the +X direction, and the blue light beams BLs, BLp are reflected toward the +X direction by a reflecting member so as to enter the first polarization split element 22 in the +X direction.

Further, it is assumed that the light source devices 2A through 2E each have the chassis CA as the light source device chassis. However, this is not a limitation, and the chassis CA can be eliminated. In this case, it is sufficient to define an imaginary orthogonal plane with respect to the +Z direction in which the light source device emits the colored light beams as the exit surface ES, and define the positions at which the first through fourth colored light beams pass through the imaginary orthogonal plane as the first through fourth exit positions.

In each of the embodiments described above, it is assumed that the projector is provided with the homogenization device 4 having the multi-lenses 41, 42 and the superimposing lens 43. However, this is not a limitation, and the homogenization device 4 can be eliminated. In this case, it is possible to provide a homogenization device having another configuration.

In each of the embodiments described above, it is assumed that the light source devices 2A through 2E are each for emitting the light which enters the light modulation device 6 having the liquid crystal panel 61 and the microlens array 62. However, this is not a limitation, and the configuration of the light modulation device illuminated by the light source device according to the present disclosure is not limited to the above.

Further, the light source device according to the present disclosure is not limited to the light source device adopted in the projector, but can be a device to be used for other purposes.

What is claimed is:

1. A light source device configured to emit a light beam in a first direction, comprising:
   a first exit position from which a first colored light beam is emitted;
   a second exit position which is located at a second direction side of the first exit position, and from which a second colored light beam is emitted;
   a third exit position which is located at a third direction side of the first exit position, and from which a third colored light beam is emitted; and
   a fourth exit position which is located at the second direction side of the third exit position, and from which a fourth colored light beam is emitted, wherein
   the second direction and the third direction are perpendicular to the first direction, and are perpendicular to each other,
   at least one of the first colored light beam, the second colored light beam, the third colored light beam, and the fourth colored light beam is a target colored light beam which has a peak wavelength out of a reference wavelength range, and a beam diameter of which is to be adjusted,
   an adjusting element is disposed in a light path of the target colored light beam, and
   the adjusting element is one of
      a diameter reduction element configured to reduce the beam diameter of the target colored light beam when the target colored light beam has the peak wavelength longer than an upper limit value of the reference wavelength range, and
      a diameter expansion element configured to expand the beam diameter of the target colored light beam when the target colored light beam has the peak wavelength shorter than a lower limit value of the reference wavelength range.

2. The light source device according to claim 1, wherein the diameter reduction element is one of a convex lens and a concave mirror, and
the diameter expansion element is one of a concave lens and a convex mirror.

3. The light source device according to claim 1, wherein out of the first colored light beam, the second colored light beam, the third colored light beam, and the fourth colored light beam,
   one is a green light beam,
   one is a red light beam,
   one is a blue light beam, and
   one is one of a green light beam and a yellow light beam.

4. The light source device according to claim 3, wherein one of the first colored light beam and the second colored light beam is the blue light beam,
another of the first colored light beam and the second colored light beam is one of the green light beam and the yellow light beam,
one of the third colored light beam and the fourth colored light beam is the green light beam, and
another of the third colored light beam and the fourth colored light beam is the red light beam.

5. The light source device according to claim 4, wherein
the reference wavelength range is included in a wavelength region of the green light beam,
the diameter reduction element is disposed in a light path of the red light beam as the other of the third colored light beam and the fourth colored light beam, and
the diameter expansion element is disposed in a light path of the blue light beam as the one of the first colored light beam and the second colored light beam.

6. The light source device according to claim 5, wherein
the other of the first colored light beam and the second colored light beam is the yellow light beam, and
the diameter reduction element is disposed in a light path of the yellow light beam as the other of the first colored light beam and the second colored light beam.

7. The light source device according to claim 5, wherein
the other of the first colored light beam and the second colored light beam is the green light beam, and
a blocking element configured to transmit the green light beam and block another colored light beam is disposed in a light path of the green light beam as the other of the first colored light beam and the second colored light beam.

8. The light source device according to claim 1, further comprising:
a first color separation element configured to separate the first colored light beam and the second colored light beam from a light beam including the first colored light beam and the second colored light beam; and
a second color separation element configured to separate the third colored light beam and the fourth colored light beam from a light beam including the third colored light beam and the fourth colored light beam.

9. The light source device according to claim 8, wherein
the adjusting element is disposed in the light path of the target colored light beam separated by a color separation element configured to separate the target colored light beam out of the first color separation element and the second color separation element.

10. The light source device according to claim 9, wherein
the adjusting element is integrated with the color separation element configured to separate the target colored light beam out of the first color separation element and the second color separation element.

11. The light source device according to claim 8, wherein
the first color separation element includes
a first color separation layer configured to transmit the first colored light beam, and reflect the second colored light beam, and
a first reflecting layer located at the second direction side of the first color separation layer, and configured to reflect the second colored light beam reflected by the first color separation layer in parallel to the first colored light beam transmitted through the first color separation layer, and
the second color separation element includes
a second color separation layer configured to transmit the third colored light beam, and reflect the fourth colored light beam, and
a second reflecting layer located at the second direction side of the second color separation layer, and configured to reflect the fourth colored light beam reflected by the second color separation layer in parallel to the third colored light beam transmitted through the second color separation layer.

12. The light source device according to claim 11, wherein
when the adjusting element is disposed in a light path of the first colored light beam, the first color separation layer is provided to a plane of incidence of light of the adjusting element,
when the adjusting element is disposed in a light path of the second colored light beam, the first reflecting layer is provided to the plane of incidence of light of the adjusting element,
when the adjusting element is disposed in a light path of the third colored light beam, the second color separation layer is provided to the plane of incidence of light of the adjusting element, and
when the adjusting element is disposed in a light path of the fourth colored light beam, the second reflecting layer is provided to the plane of incidence of light of the adjusting element.

13. The light source device according to claim 8, further comprising:
a light source section configured to emit a source light beam;
a first polarization split element configured to transmit a first polarization component of the source light beam in the third direction, and reflect a second polarization component of the source light beam in an opposite direction to the first direction out of the source light beam emitted from the light source section and enters the first polarization split element along the third direction;
a second polarization split element located at the third direction side of the first polarization split element, and configured to reflect the first polarization component of the source light beam entering the second polarization split element in the third direction toward the opposite direction to the first direction;
a first reflecting element located in the opposite direction side to the first direction side of the first polarization split element, and configured to reflect the source light beam entering the first reflecting element toward the first direction;
a first retardation element located between the first polarization split element and the first reflecting element in the first direction, and configured to convert a polarization component of the source light beam;
a wavelength conversion element located at the opposite direction side to the first direction side of the second polarization split element, and configured to emit a converted light beam as unpolarized light, which is obtained by performing wavelength conversion on the first polarization component of the source light beam entering the wavelength conversion element in the opposite direction to the first direction, toward the first direction;
a second retardation element which is a ½ wave plate located in the light path of the first colored light beam separated by the first color separation element, and converts a polarization direction of the first colored light beam and then emits the first colored light beam; and
a third retardation element which is a ½ wave plate which is located at the first direction side of the second polarization split element, and which the converted light beam transmitted through the second polarization split element enters, wherein
the second polarization split element transmits the first polarization component of the converted light beam in the first direction to thereby make the first polarization component enter the third retardation element, and reflects the second polarization component of the converted light beam toward an opposite direction to the third direction out of the converted light beam entering the second polarization split element in the first direction, the first polarization split element transmits the first polarization component of the source light beam entering the first polarization split element in the first direction toward the first direction to thereby make the first polarization component enter the first color separation element, and reflects the second polarization component of the source light beam entering the first polarization split element in the opposite direction to the third direction toward the first direction to thereby make the second polarization component enter the first color separation element, the first color separation element is located at the first direction side of the first polarization split element, emits the first polarization component of the source light beam entering the first color separation element from the first polarization split element to the second retardation element, and emits the second polarization component of the converted light beam entering the first color separation element from the first polarization split element, and the second color separation element is located at the first direction side of the third retardation element, emits a first color component included in the second polarization component of the converted light beam entering the second color separation element from the third retardation element, and emits a second color component included in the second polarization component of the converted light beam.

14. An illumination optical device comprising:
the light source device according to claim 1;
a pair of multi-lenses configured to divide the light beam entering the pair of multi-lenses from the light source device into a plurality of partial light beams; and
a superimposing lens configured to superimpose the plurality of partial light beams entering the superimposing lens from the pair of multi-lenses on a predetermined position.

15. A projector comprising:
the illumination optical device according to claim 14;
a light modulation device configured to modulate light emitted from the illumination optical device; and
a projection optical device configured to project the light modulated by the light modulation device, wherein
the light modulation device includes
   a single liquid crystal panel having a plurality of pixels, and
   a microlens array which has a plurality of microlenses corresponding to the plurality of pixels, and is located at a light incident side of the single liquid crystal panel,
the pixels each include a first sub-pixel, a second sub-pixel, a third sub-pixel, and a fourth sub-pixel, and
the plurality of microlenses makes
   the first colored light beam enter the first sub-pixels,
   the second colored light beam enter the second sub-pixels,
   the third colored light beam enter the third sub-pixels, and
   the fourth colored light beam enter the fourth sub-pixels.

* * * * *